United States Patent [19]

Rouaud et al.

[11] Patent Number: 5,684,688

[45] Date of Patent: Nov. 4, 1997

[54] SOFT SWITCHING THREE-LEVEL INVERTER

[75] Inventors: Didier G. Rouaud, Twinsburg; Tony C. Aboumrad, Parma Heights, both of Ohio

[73] Assignee: Reliance Electric Industrial Company, Cleveland, Ohio

[21] Appl. No.: 668,885

[22] Filed: Jun. 24, 1996

[51] Int. Cl.[6] .................................................. H02M 7/5387
[52] U.S. Cl. .................................................. 363/132; 363/98
[58] Field of Search .............................. 363/17, 43, 97, 363/98, 131, 132

[56] References Cited

U.S. PATENT DOCUMENTS

| | | |
|---|---|---|
| 4,203,151 | 5/1980 | Baker ................................ 363/43 |
| 4,270,163 | 5/1981 | Baker ................................ 363/43 |
| 4,881,159 | 11/1989 | Holtz et al. ........................ 363/58 |
| 5,047,913 | 9/1991 | De Doncker et al. .............. 363/95 |
| 5,459,665 | 10/1995 | Mori et al. ........................ 363/132 |
| 5,506,765 | 4/1996 | Nakata et al. ..................... 363/98 |
| 5,517,401 | 5/1996 | Kinoshita ......................... 363/98 |

*Primary Examiner*—Matthew V. Nguyen
*Attorney, Agent, or Firm*—Mike A. Jaskolski; John M. Miller; John J. Horn

[57] ABSTRACT

A three-level NPC inverter topology including two auxiliary resonant commutation circuits which are controlled to clamp the voltage across each main inverter switch to zero voltage prior to altering the state of the switch in order to achieve soft switching of all main inverter switches while reducing output voltage harmonics and gradients.

25 Claims, 21 Drawing Sheets

5,684,688

SOFT SWITCHING THREE-LEVEL INVERTER

FIELD OF THE INVENTION

The present invention is related to voltage source inverters (n-phase) using switching devices such as transistors or the like. More particularly, the invention includes improvements in the topology of a three-level neutral point clamped inverter in order to reduce losses and voltage gradient stresses on a load (motor, line . . . ). This topology can be extended to n-level neutral point clamped inverter topologies.

DESCRIPTION OF THE ART

One example of a load that can be controlled by the present inventive topology is an induction motor. One type of commonly designed induction motor is a three-phase motor having three Y-connected stator windings. In this type of motor, each stator winding is connected to an AC voltage source by a separate supply line, the source generating currents therein. Often, an adjustable speed drive (ASD) will be positioned between the voltage source and the motor to control motor speed and/or torque.

I. Two-Level Topology

Many ASD configurations include a two-level PWM inverter consisting of a plurality of switching devices. By firing the switching devices in a regulated sequence the PWM inverter can be used to control both the amplitude and frequency of stator winding voltages.

Referring to FIG. 1, an exemplary ideal sequence of high frequency terminal voltage pulses that an inverter might provide to a motor terminal can be observed along with an exemplary low frequency alternating fundamental voltage $V_f$ and related alternating current $I_f$. By varying the widths of the positive portions $10_p$ of each high frequency pulse relative to the widths of the negative portions $10_n$ over a series of high frequency voltage pulses 10, a changing average voltage which alternates sinusoidally can be generated. The changing average voltage defines the low frequency alternating voltage $V_f$ that drives the motor. The low frequency alternating voltage $V_f$ in turn produces the low frequency alternating current $I_f$ that lags or leads the voltage by a phase angle $\Phi$.

While simple two-level inverters are used in many different applications, simple two-level inverters have various shortcomings that render them unsuitable for other applications. For example, while the curves shown in FIG. 1 represent ideal switching results, simple PWM inverter configurations place excessive switching stresses across PWM switches and result in high switching power losses. These switching losses increase linearly with switching frequency of the PWM switches. In addition, simple PWM configurations typically cause excessive harmonics and gradients in output voltage and current waveforms due to high switching frequencies and high instantaneous voltage and current swings between the positive and negative magnitudes of the high frequency voltage pulses 10.

To illustrate the power loss problems associated with switch mode operation, consider one leg of a PWM DC to AC inverter as shown in FIG. 2. A DC voltage $V_{dc}$ supplies positive 12 and negative 14 DC rails. Upper $SW_U$ and lower $SW_L$ switches are connected in series between the positive and negative DC rails 12, 14. Upper $D_U$ and lower $D_L$ diodes are connected in anti-parallel across the upper and lower switches $SW_U$, $SW_L$ respectively. A supply line 16 is connected between the upper and lower switches $SW_U$, $SW_L$.

Output current $I_f$ on supply line 16 can be in either direction and can be assumed to have a constant magnitude due to load inductance during any of the brief switching intervals. The simplified voltage and current waveforms for the lower switch $SW_L$ are shown in FIG. 3.

Initially, with the lower switch $SW_L$ closed, a current $I_T$ through the lower switch is assumed to be equal to the output current $I_f$ (where $I_f$ is negative as it flows into the circuit). At $\tau_1$, a control signal is applied to turn-off the lower switch $SW_L$ at which point the voltage $V_T$ across the lower switch $SW_L$ increases and overshoots an eventual steady-state voltage due to stray inductances. Then, the switch current $I_T$ decays to zero. After the lower switch $SW_L$ is turned off, the output current $I_f$ flows through the upper diode $D_U$. The power loss $P_{off}$ during the turn-off period $T_{off}$ is represented by the dotted line in FIG. 3 and is equal to $V_T * I_T$.

Referring still to FIG. 3, when the lower switch $SW_L$ is again to be turned on, prior to turning the switch on, the output current $I_f$ is flowing through the upper diode $D_U$. When a control signal is applied to the lower switch $SW_L$ to turn the switch on at $\tau_2$ the switch current $I_T$ increases and overshoots a steady-state current magnitude due to peak reverse recovery current through the upper diode $D_U$. Subsequently, the diode $D_U$ recovers and the switch voltage $V_T$ decreases to essentially zero at the end of a turn-on period $T_{on}$. Similar to the power loss during the turn-off period $T_{off}$, the simultaneous presence of a switch voltage $V_T$ and a switch current $I_T$ during the turn-on period results in a switching power loss $P_{on}$.

For the positive current direction the principle is the inverse of that described above for the negative current case. Thus, in FIG. 2, where $I_f$ is flowing out of the circuit the potential across the upper switch $SW_U$ shoots over an eventual steady state voltage prior to the switch current decaying to zero. The power loss during the turn-off period for the upper switch is equal to $V_T * I_T$. During a turn-on period for the upper switch there is another power loss like the one described above for the lower switch $SW_L$.

The average value of the switching losses $P_{off}$ and $P_{on}$ is proportional to the switching frequency. Therefore, the switching losses caused by a specific PWM configuration limit how high the switching frequency can be pushed without significantly degrading the efficiency of the PWM system.

Two-Level Topology Snubbers

1. RCD Snubber

Power losses within PWM switches have been reduced by connecting simple dissipative snubber circuits (consisting of diodes and passive components) in series and in parallel with PWM switches. Such snubber circuits are well known in the art. Unfortunately, while these snubber circuits will reduce switching stresses, the overall power loss associated with PWM configurations including conventional snubbers is nearly identical to configurations that do not include snubbers. Dissipative snubbers shift switching power loss from the switches to the snubbers which "dissipate" power through heating. Thus, conventional snubbers do not provide an appreciable reduction in overall switching power losses.

2. Soft-Switching Snubber (Bingen/DeDoncker)

Another solution to PWM switching power loss has been to configure PWM topologies wherein switches within an inverter are turned on and off when either the switch voltage and/or the switch current is zero. Because switching with no voltage or no current minimizes power loss and reduces switch stress, this type of switching is commonly referred to as "soft switching".

One effective soft-switching topology has been described in a Bingen paper entitled "Utilisation De Transistors a Fort Courant Et Tension Elevee", 1st European Power Electronics Conference, Oct. 16–18, 1985, (Conference Record vol. 1), and its control has been described in greater detail in U.S. Pat. No. 5,047,913 entitled "Method For Controlling A Power Converter Using An Auxiliary Resonant Commutation Circuit" which issued to DeDoncker, et al. on Sep. 10, 1991. Bingen and DeDoncker teach an apparatus wherein an auxiliary commutation circuit is included with a typical two-level PWM inverter topology. The auxiliary circuit is coupled in series with an inductor and two snubber capacitors across series coupled switches. Bingen/DeDoncker's control method and topology allow for control of the gating and conduction times of the auxiliary switching devices to ensure that the output voltage reaches positive and negative rails during each resonant commutation cycle which provides an uncharged snubbing capacitor across each main inverter switch prior to altering the state of the switch. Thus, this method provides true soft-switching of the main inverter switching devices.

While the Bingen and DeDoncker method nearly eliminates power losses due to PWM switching, it does not minimize the harmonic components in voltage and current output waveforms. The industry has developed other configurations to limit output waveform harmonics. One solution to the harmonics problem is known as a three-level inverter topology.

II. Three-Level Topology

U.S. Pat. No. 4,203,151 entitled "High Voltage Converter Circuit" which issued to Baker on May 13, 1980 and U.S. Pat. No. 4,270,163 entitled "Bridge Converter Circuit" which issued to Baker on May 26, 1981, each describe typical three-level NPC inverters. Each of Baker's inverters includes four series connected semiconductor switching devices which connect positive and negative DC rails, a neutral point is located between separate series connected pairs of said switches. The junction between a first and a second switching device and the junction between a third and a fourth switching device are each connected to the neutral point output terminal by way of a clamping device such as a diode. The junction between the second and third switching devices constitutes an inverter output terminal.

Whereas the commonly employed two-level inverter described above and in more detail in the DeDoncker patent can output only two voltage levels (positive and negative) a three-level inverter is capable of outputting three voltage levels including:

(a) the positive potential of the DC power supply when the first and second switches are turned on;

(b) zero potential when the second and third switches are turned on; or (c) the negative potential of the DC power supply when the third and fourth switches are turned on.

Referring now to FIG. 4, an exemplary ideal sequence of high frequency terminal voltage pulses 10' that a three-level inverter might provide to a motor terminal can be observed along with an exemplary low frequency alternating fundamental voltage $V_f$ and a related alternating current $I_f$. As shown in FIG. 4, a three-phase inverter can provide half cycles of the low frequency fundamental voltage $V'_f$ by generating identical but opposite polarity pulse trains, a positive pulse train $10'_p$ oscillating between zero and a positive DC voltage value (during zone $\zeta_p$) and a negative pulse train $10'_n$ which provides the negative half cycle of the voltage $V'_f$ (during zone $\zeta_n$) oscillating between zero and the negative DC voltage value. The three-level switching method reduces the amount of required switching and the magnitude of instantaneous voltage and current swings (i.e. the swing is now between $+V_{dc}$ or $-V_{dc}$ and zero as opposed to between $+V_{dc}$ and $-V_{dc}$). Hence, three-level switching methods reduce output voltage and current harmonics.

RCD Snubber

U.S. Pat. No. 4,881,159 entitled "Switching-Relieved Low-Loss Three-Level Inverter" which issued to Holtz et al. on Nov. 14, 1989, describes a three-level inverter topology which uses a dissipative snubbing network including a diode, resistor and capacitor to reduce switching stresses. However, this dissipative network, like the dissipative snubbing networks described above, produces at least some losses during operation.

DISCUSSION LEADING TO INVENTION

While the Bingen/DeDoncker topology provides a useful solution to power loss in two-level inverters and three-level inverters provide a useful solution to problems associated with excessive output harmonics and voltage gradients, the industry has yet to develop a simple inverter topology which addresses both the problems of excessive output harmonics and power loss due to PWM switching despite general recognition of the problem.

A seemingly logical solution to this problem would be to stack together two separate two-level inverters based on the two-level inverter described in the above referenced DeDoncker patent to provide a three-level topology. Unfortunately, this solution has proven impossible as such a simple stacking design provides excessive voltages to the three-level inverter switches causing definite switch destruction.

Thus, it would be advantageous to have a PWM inverter configuration which could reduce output voltage and harmonics and at the same time facilitate soft switching to eliminate turn-on and turn-off power losses.

SUMMARY OF THE INVENTION

The present invention is an improved three-level (n-level) neutral point clamped (NPC) inverter topology which uses two (n-1) auxiliary resonant commutation circuits and includes a triggering method associated with the new topology. Reduced switching losses (for example "zero"-voltage, "zero"-current, turn-on switching of the main devices), reduced voltage gradients and reduced output harmonics are some of the benefits provided by this invention.

One object of the present invention is to reduce switching power losses and minimize output harmonics in a three-level NPC inverter. The inventive topology includes a current provider that can be used to provide either a current sink or a current source at various inverter nodes. The topology also includes an arrangement of diodes and capacitors, including anti-parallel coupled diode and capacitor sets across each switch. By controlling the current provider to provide either a current source or a current sink at various nodes, each capacitor can be discharged causing an associated diode to clamp zero voltage across an associated switch prior to altering the state of the switch. Thus, when properly controlled, the current provider can be used to ensure zero voltage switching of inverter switches even in a three-level NPC inverter to reduce power loss and minimize output harmonics.

Yet another object of the present invention is to achieve the aforementioned objects with a minimal number of configuration components and at a minimal cost. The inventive configuration achieves the aforementioned objects and requires only a small number of additional components to do so.

Other and further aspects and objects of the present invention will become apparent during the course of the following description and by reference to the accompanying drawings.

DETAILED DESCRIPTION OF THE PREFERRED EMBODIMENT

Figure 5:
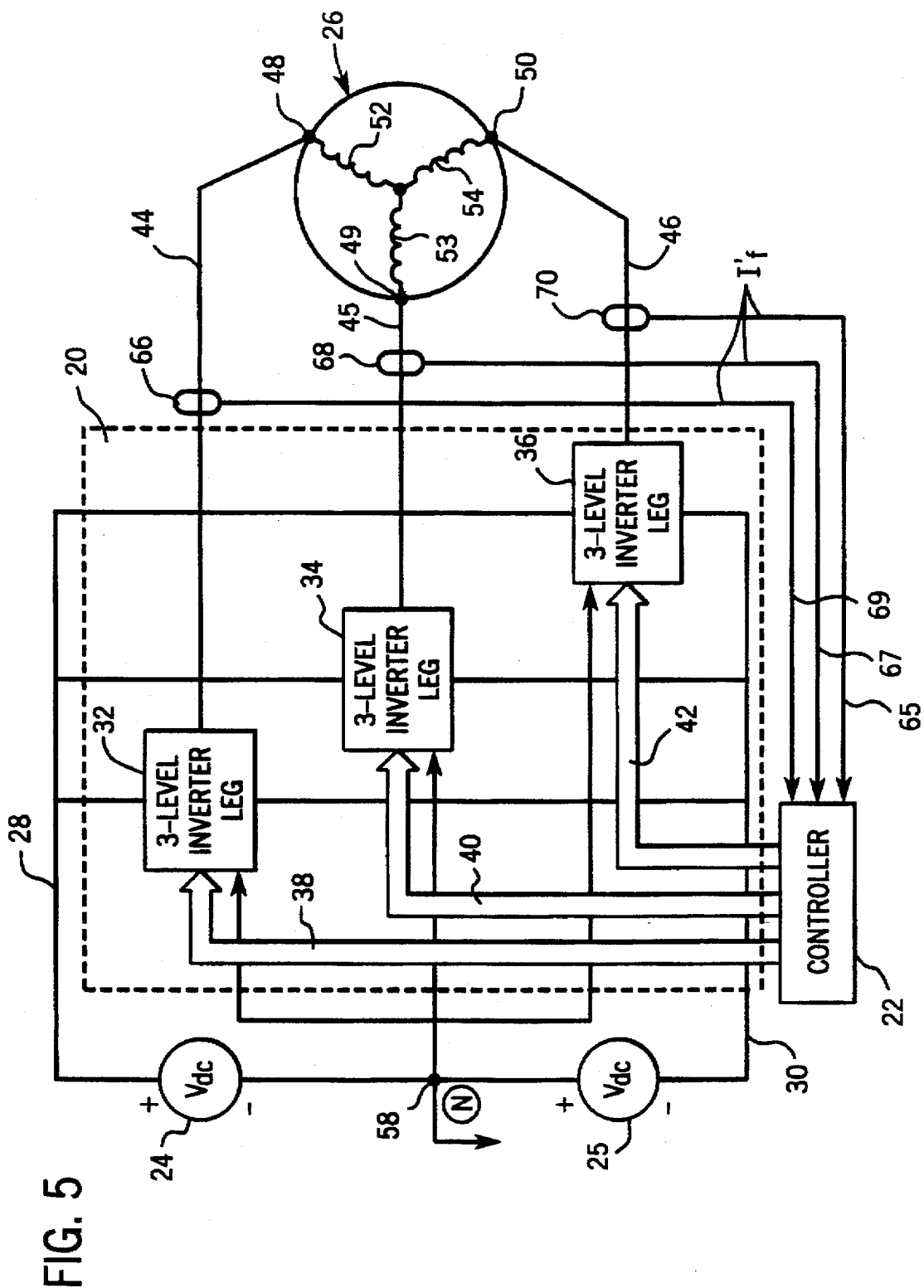
FIG. 5 is a schematic diagram of a motor controller according to the three-level NPC topology.

The present invention will be described in the context of the exemplary three-phase, three-level NPC inverter 20 shown in FIG. 5. The inverter 20 is shown connected to a controller 22, two DC voltage sources 24, 25, of equal magnitude and a motor 26. The two DC voltage sources 24, 25 provide positive and negative DC rails 28, 30 respectively. The inverter 20 consists of three separate three-level inverter legs 32, 34, 36. The legs 32, 34, 36 are connected in parallel between the positive 28 and negative 30 DC rails and as an option to the neutral rail 58. Each leg 32, 34, 36 consists of a plurality of solid-state switching devices (BJT, GTO, IGBT or other switching device may be used) and various other well known electronic components which will be described in more detail below.

Each three-level inverter leg 32, 34, 36 receives signals from the controller 22 via buses 38, 40, 42 and provides a voltage on an associated motor supply line 44, 45 or 46 which is connected to a stator winding terminal 48, 49 or 50. Thus, the voltage provided on lines 44, 45, and 46 is provided across stator windings 52, 53, 54 respectively. Three separate current transformers 66, 68, 70, or other similar current detecting devices, can be used on lines 44, 45, 46 to provide current feedback $I_f$ to the controller 22 via lines 65, 67, and 69.

Figure 6:
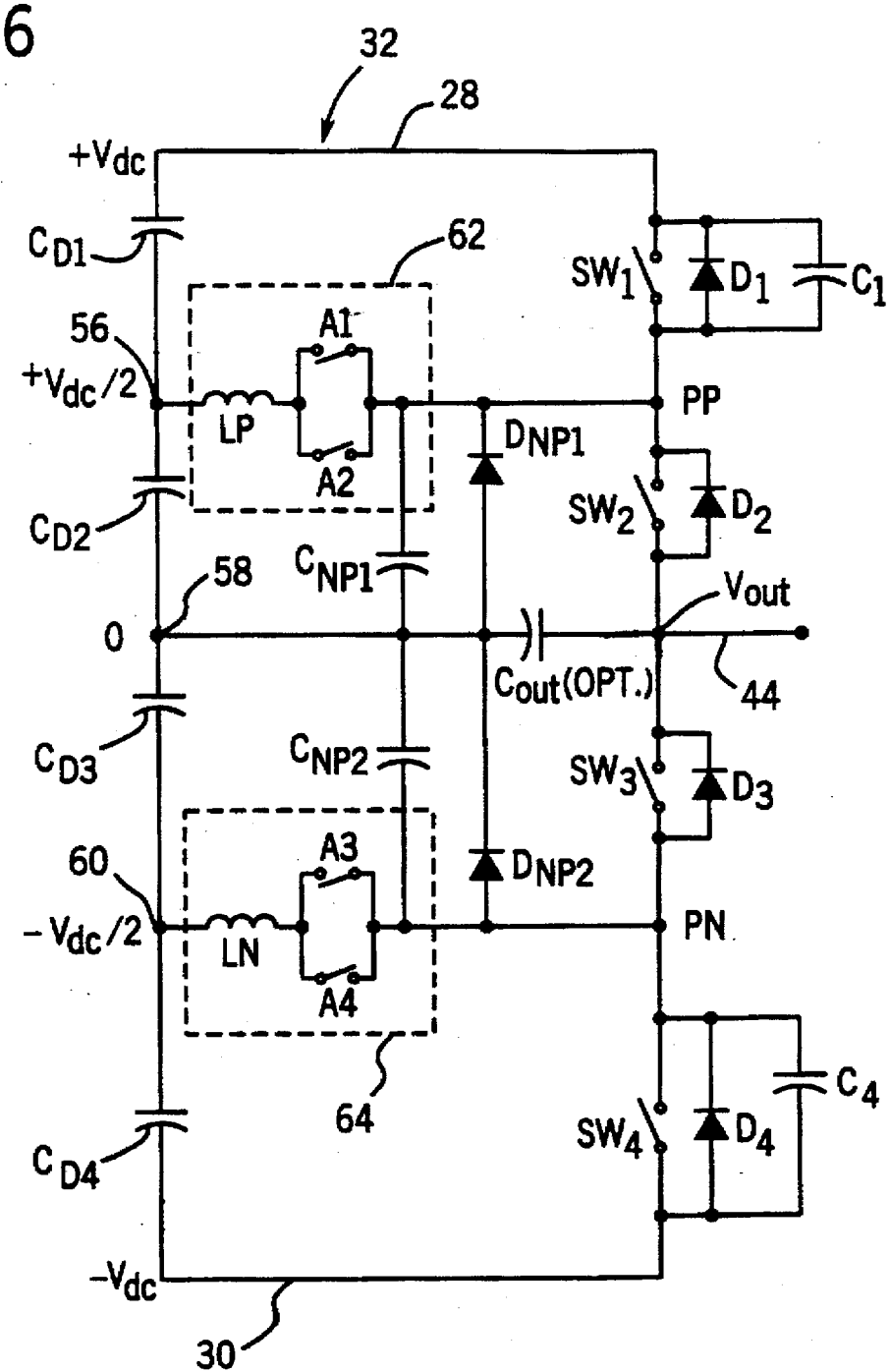
FIG. 6 is a schematic of an embodiment of a single leg of three-level NPC inverter according to the present invention.

Referring also to FIG. 6, a preferred topology of each three-level inverter leg 32, 34 or 36 can be observed. To avoid repetitive disclosure, only inverter leg 32 will be explained in detail as all three-level inverter legs 32, 34 and 36 are configured in, and operate in, the same manner. Inverter leg 32 includes four main switching devices $SW_1$, $SW_2$, $SW_3$, $SW_4$ arranged in series between the positive DC rail 28 and the negative DC rail 30. The first $SW_1$ and second $SW_2$ main switches are connected at a first interswitch node identified as PP. Similarly, the third $SW_3$ and fourth $SW_4$ main switches are connected at a second interswitch node identified as PN. The second and third main switches $SW_2$ and $SW_3$ respectively are connected at an interswitch output node identified as $V_{out}$ which is connected to supply line 44. The first and second main switches form a switch pair. Similarly, the third and fourth main switches $SW_3$, $SW_4$ also form a switch pair. The first and second main switches $SW_1$ and $SW_2$ conduct only positive current while the third and fourth main switches conduct only negative current (i.e., all main switches are unidirectional).

Each main switch $SW_1$, $SW_2$, $SW_3$, and $SW_4$ has a unique associated diode $D_1$, $D_2$, $D_3$ or $D_4$ arranged in anti-parallel relationship. Hereinafter these diodes will be referred to as the first, second, third, and fourth diodes $D_1$, $D_2$, $D_3$ and $D_4$, respectively. In addition, the first main switch $SW_1$ has a first capacitor $C_1$ connected in parallel while the fourth main switch $SW_4$ has a fourth capacitor $C_4$ connected in parallel. In this preferred embodiment there is no capacitor across either the second or third switches $SW_2$, $SW_3$.

Referring still to FIG. 6, four voltage splitting capacitors $C_{D1}$, $C_{D2}$, $C_{D3}$, and $C_{D4}$ are arranged in series between the positive 28 and negative 30 DC rails. The voltage splitting capacitors have identical operating characteristics and therefore, divide the voltage between the positive and negative DC rails 28, 30 "equally" so that a third node 56 between the first $C_{D1}$ and the second $C_{D2}$ voltage splitting capacitors has a constant value of $+V_{DC}/2$, a neutral node 58 between the second $C_{D2}$ and third $C_{D3}$ voltage splitting capacitors has a zero voltage, and a fourth node 60 between the third $C_{D3}$ and fourth $C_{D4}$ voltage splitting capacitors has potential equal to $-V_{dc}/2$.

An optional output capacitor $C_{out}$ is connected between the output node $V_{out}$ and the neutral node 58. A first neutral point clamping diode $D_{NP1}$ and a first neutral point clamping capacitor $C_{NP1}$ are connected in parallel between the neutral node 58 and node PP. Similarly, a second neutral point clamping diode $D_{NP2}$ is connected in parallel with a second neutral point clamping capacitor $C_{NP2}$ between the node PN and the neutral node 58.

A first auxiliary switch $A_1$ and a second auxiliary switch $A_2$ are connected in anti-parallel to form a first parallel set which is connected in series with an upper inductor LP between node 56 and node PP. Similarly, a third auxiliary switch $A_3$ is arranged in parallel with a fourth auxiliary switch $A_4$ to form a second parallel set, the second parallel set being arranged in series with a lower inductor LN between nodes 60 and PN. In a preferred embodiment, each one of the auxiliary switches $A_1$, $A_2$, $A_3$, and $A_4$ is a thyristor switch wherein, after the switch has been turned on, the switch remains in a conducting state until current therethrough decreases to a zero or nearly zero magnitude at which point the switch turns off and becomes nonconducting.

The first $A_1$ and second $A_2$ auxiliary switches and upper inductor LP together form an upper auxiliary resonant commutation circuit 62. Similarly, the third $A_3$ and fourth $A_4$ auxiliary switches and lower inductor LN form a lower auxiliary resonant commutation circuit 64.

In accordance with the present invention and in addition to the proposed topology, a control method is provided for determining a gating sequence and conduction times of main switches $SW_1$, $SW_2$, $SW_3$, and $SW_4$, and auxiliary switches $A_1$, $A_2$, $A_3$, and $A_4$ to achieve soft switching of the main switches wherein switching power loss is minimal. The timing is controlled in such a manner that the auxiliary circuits 62, 64 either provide a current or sink a current which discharges all capacitors in parallel with a main switch to be turned on wherein the switch to be turned on is a next-on switch. The parallel capacitors are all discharged prior to turning on the next-on switch. In particular, the upper auxiliary circuit 62 provides extra current at, or acts as a current sink at, node PP so as to force a zero voltage potential $V_{SW1}$ across the first main switch $SW_1$ prior to altering the state of that switch and forces a zero voltage potential $V_{SW3}$ across the third main switch $SW_3$ prior to altering the state of that switch. Similarly, the lower auxiliary circuit 64 provides extra current at, or provides a current sink at node PN so as to force zero voltage potential $V_{SW2}$ across the second main switch $SW_2$ prior to altering the state of that switch and forces a zero voltage potential $V_{SW4}$ across the fourth main switch $SW_4$ prior to altering the state of that switch.

Referring still to FIG. 6, the inverter leg 32 is capable of outputting three different voltage levels: (1) when the first $SW_1$ and second $SW_2$ main switches are closed, the output line 44 is connected to the positive DC rail 28 and the output voltage $V_{out}$ on line 44 is $+V_{dc}$; (2) when the third $SW_3$ and fourth $SW_4$ main switches are both closed, output line 44 is connected to the negative DC rail and the output voltage is $-V_{dc}$; (3) when the second $SW_2$ and third $SW_3$ main switches are closed, the output line 44 is connected to neutral node 58 and the output voltage $V_{out}$ on line 44 is zero. and the output line 44. At all times either the second $SW_2$ or third $SW_3$ main switch is closed and never more than two main switches are closed at the same time.

With the three-level NPC inverter, $V_{out}$ potential never switches from $+V_{dc}$ to $-V_{dc}$ or vice versa without first switching to the zero output potential $V_{out}$. Thus, there are only four main switching sequences for the present inverter leg 32: zero to $+V_{dc}$, $+V_{dc}$ to zero, zero to $-V_{dc}$, and $-V_{dc}$ to zero.

As with typical two-level inverters which introduce turn-on delay periods between consecutive turn-off and turn-on times of series arranged switches to eliminate the possibility of a short circuit between positive and negative DC rails, the three-level inverter leg 32 also provides for turn-on delay periods during each switching sequence. Thus, referring still to FIG. 6 to switch the output potential $V_{out}$ from zero voltage to $+V_{dc}$, first the third main switch $SW_3$ (in this case a "turned-off" switch) must be opened and then, only after a delay period, can the first main switch $SW_1$ (in this case the "next-on" switch) be closed connecting line 44 to positive DC rail 28. Similarly, when switching from zero output potential $V_{out}$ to the negative DC rail 30, first the second main switch $SW_2$ must be opened and then, after a delay period, the fourth main switch $SW_4$ may be closed. Similar delay periods are provided when switching from the positive DC rail 28 to zero and from the negative DC rail 30 to zero.

The present invention provides current or a current sink when necessary during these turn-on delay periods to force zero potential across a main switch prior to turning said switch on. Referring again to FIGS. 5 and 6, prior to turning on the first main switch $SW_1$, the control ensures that the first capacitor $C_1$, is discharged. Prior to turning on either the second $SW_2$ or third $SW_3$ main switches the control ensures that the first clamping $C_{NP1}$ and second clamping $C_{NP2}$ as well as output $C_{out}$ (opt.) capacitors are discharged. Prior to turning on the fourth main switch $SW_4$ the control ensures that the fourth capacitor $C_4$ is completely discharged.

Figure 1:
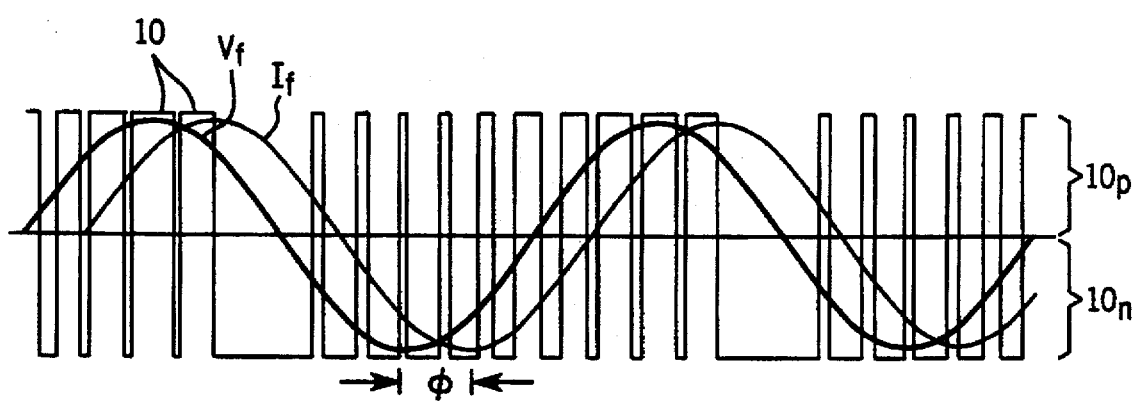
FIG. 1 is a graph illustrating ideal high frequency pulses and resulting ideal low frequency voltage and current applied to a stator winding by a two-level PWM inverter.
Figure 2:
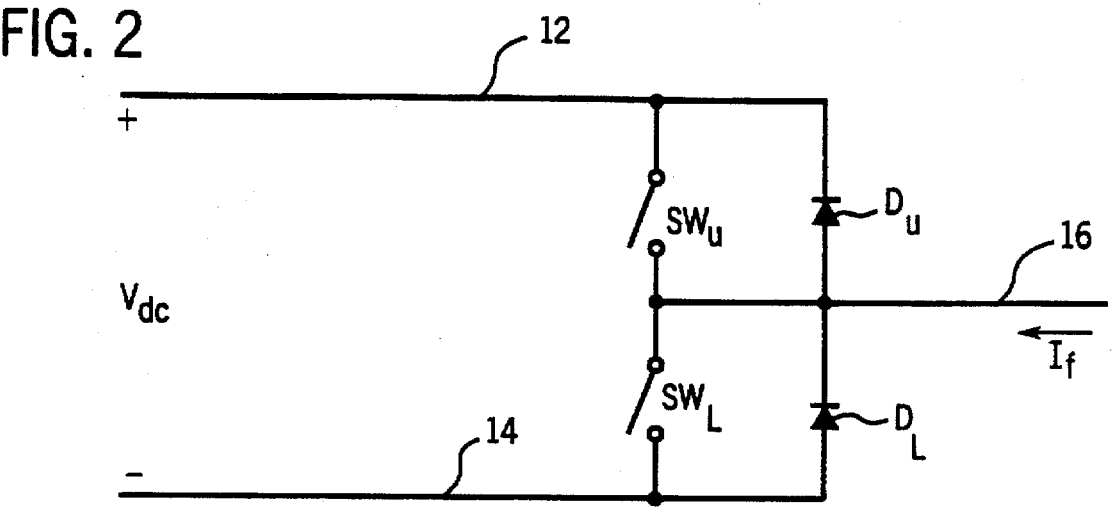
FIG. 2 is a simple schematic showing a prior art two-level PWM switching circuit for a single inverter leg.
Figure 3:
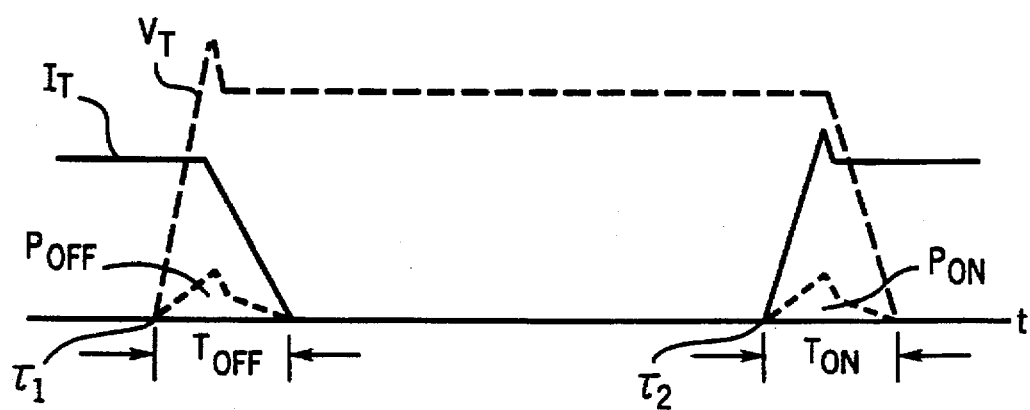
FIG. 3 is a graph illustrating switching voltage current and power during both turn-on and turn-off periods for the typical PWM switch shown in FIG. 2.
Figure 4:
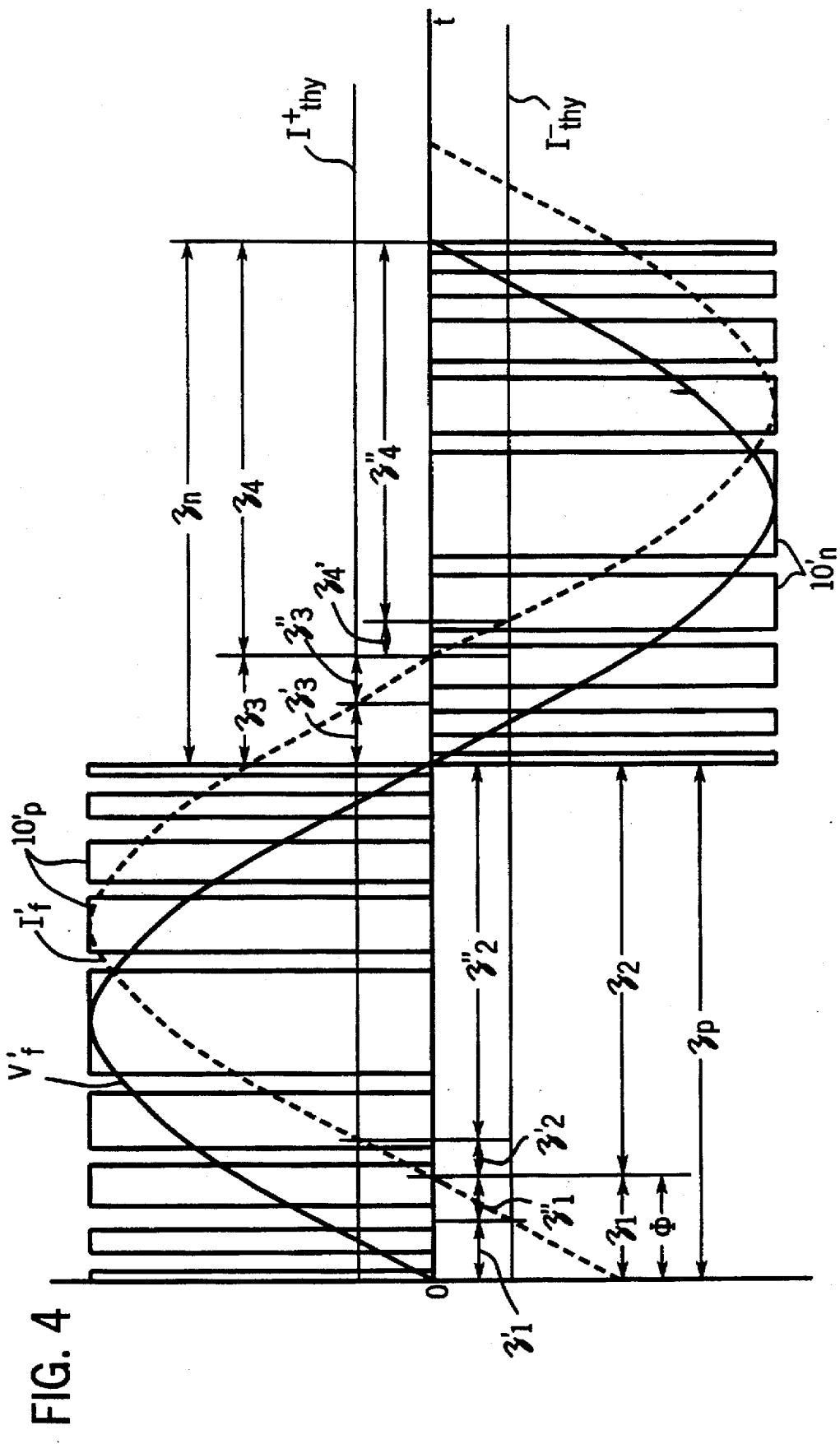
FIG. 4 is a graph illustrating high frequency pulses and the resulting low frequency alternating voltage applied to a stator winding by one leg of a three-level NPC inverter.

Referring to FIG. 4, to produce the positive half cycle $\zeta_p$ of line voltage $V'_p$ the control manipulates main switches $SW_1$, $SW_2$, and $SW_3$ so as to alternately connect the supply line 44 between the positive DC rail 28 and the neutral node 58 producing the high frequency positive voltage pulse train $10'_p$. To provide the negative half cycle (during $\zeta_n$) of line voltage $V'_f$, the control manipulates main switches $SW_2$, $SW_3$, and $SW_4$ so as to alternately connect supply line 44 between the negative DC rail 30 and the neutral node 58 producing the high frequency negative voltage pulse train $10'_n$. The averaging of the positive pulse train $10'_p$ and of the negative pulse train $10'_p$ provides the fundamental waveform of the line voltage $V'_f$. The voltage $V'_f$ on output line 44 in turn generates an output line current $I'_f$ which, for example, lags the voltage $V'_f$ by the phase angle $\Phi$.

Because the line current $I'_f$ lags the line voltage $V'_f$ by the phase angle $\Phi$, the positive half cycle $\zeta_p$ of line voltage $V'_f$ can be divided into a period $\zeta_1$ during which the line current $I'_f$ is negative and another period $\zeta_2$ during which the line current $I'_f$ is positive. Similarly, the negative half cycle $\zeta_n$ of line voltage $V'_f$ can be divided into a period $\zeta_3$ during which the line current $I'_f$ is positive and another period $\zeta_4$ during which the line current $I'_f$ is negative. These observations are important because the commutation circuits 62, 64 need only be operated under certain circumstances, those circumstances being related to which switching sequence (i.e. zero to $+V_{dc}$, $+V_{dc}$ to zero, zero to $-V_{dc}$, or $-V_{dc}$ to zero) is taking place, as well as both the direction and the magnitude of the line current $I_f$. Conditions requiring commutation circuits 62 and 64 will be described in more detail below.

At this point, however, it should be noted that the present topology allows a choice between operating auxiliary commutation circuits for every transition regardless of current direction and amplitude or operating the auxiliary circuits only when the auxiliary circuits are required. This choice will also be described in more detail below.

To further simplify the following explanation, where a main switch remains closed during a switching sequence, that switch will be depicted as a closed circuit. For example, referring to FIG. 7(a), during the zero to $+V_{dc}$ switching sequence, because the second main switch is closed in both the zero and $+V_{dc}$ line voltage conditions, the second main switch $SW_2$ remains closed throughout this sequence and is therefore shown as a short circuit. Similarly, referring to FIG. 13(a), during the zero to $-V_{dc}$ switching sequence, the third main switch $SW_3$ remains closed and is therefore shown as a short circuit. In addition, where a switch remains open during an entire switching sequence rendering circuit components irrelevant, open switches and irrelevant components do not appear in the figures. For example, referring to FIGS. 6 and 7(a), during the zero to $+V_{dc}$ switching sequence the fourth main switch $SW_4$ and auxiliary switches $A_3$ and $A_4$ remain open and therefore are not included in FIG. 7(a).

Moreover, in the following explanation, a dot next to a switch will identify a closed switch while no dot will identify an open switch. Arrows will symbolize currents, the different currents identified as upper inductive current $I_{LP}$, lower inductive current $I_{NP}$, boost current $I_b$, and line or load current $I_f$. In the present case, the term boost current is used to refer to additional current needed in the commutation circuit over the largest output current to ensure proper transition under all "normal" operating conditions of the inverter leg.

Operation of the three-level inverter leg 32 will be described separately for each one of the four switching sequences (i.e. zero to $+V_{dc}$, $+V_{dc}$ to zero, zero to $-V_{dc}$, and $-V_{dc}$ to zero). In addition, for each switching sequence, inverter leg operation is further broken down as a function of line current $I_f$ direction (i.e. flowing into or out of the inverter) and magnitude.

Zero To $+V_{dc}$ Switching Sequence

Referring now to FIGS. 4 and 6, during a zero to $+V_{dc}$ switching sequence in zone $\zeta_1$, where the line current $I_f$ is negative and flowing into the inverter leg 32 via line 44, after the third main switch $SW_3$ is opened and during a turn-on delay period prior to closing the first main switch $SW_1$, the line current $I_f$ flows up through the second diode $D_2$ and tends to discharge the first capacitor $C_1$ as desired and charges the first clamping capacitor $C_{NP1}$ and the output capacitor $C_{out}$. Given an infinite turn-on delay period, any magnitude of negative line current $I_f$ would be sufficient to completely discharge the first capacitor $C_1$ and allow proper transition. Unfortunately, the turn-on delay period is finite and therefore, there is a negative threshold current $\Gamma_{thr}^-$ defined as the minimum current required to completely discharge the first capacitor $C_1$ prior to the end of the finite delay period to ensure soft switching of $SW_1$.

When the negative line current $I_f$ has a greater magnitude than the negative threshold current $\Gamma_{thr}^-$, the line current $I_f$ alone can completely discharge the first capacitor $C_1$ in less than a delay period. However, where the negative line current $I_f$ has a magnitude less than the negative threshold current $\Gamma_{thr}^-$, the line current $I_f$ must be supplemented to ensure a completely discharged first capacitor $C_1$ during a delay period.

Referring still to FIG. 4, during inverter operation in zone $\zeta_1$ the line current $I_f$ has a greater magnitude than the negative threshold current $\Gamma_{thr}^-$ during period $\zeta'_1$ and has a magnitude less than the negative threshold current $\Gamma_{thr}^-$ during period $\zeta''_1$. Therefore, during period $\zeta'_1$, the line current $I_f$ need not be supplemented in order to discharge the first capacitor $C_1$. However, during period $\zeta''_1$, the line current $I_f$ must be supplemented.

Referring again to FIG. 4, during a zero to $+V_{dc}$ switching sequence in zone $\zeta_2$ where the line current $I_f$ is positive and flowing out of inverter leg 32 via output line 44, after the third main switch $SW_3$ is opened and prior to closing the first main switch $SW_1$, the line current $I_f$ is drawn down through the first capacitor $C_1$ tending to charge the first capacitor $C_1$. In this case, the line current $I_f$ must be completely compensated for and a boost current (i.e. current above the load current) must be provided which alone can discharge the first capacitor $C_1$ prior to the end of a delay period.

Hence, there are three separate line current-dependent zones of inverter leg operation for the zero to $+V_{dc}$ switching sequence. In a first zone $\zeta'_1$ the auxiliary circuit 62 is not required. In a second zone $\zeta''_1$, the auxiliary circuit 62 is required to supplement the line current. And in a third zone $\zeta_2$ the auxiliary circuit 62 must both compensate for the line current $I_f$ and provide an additional discharging boost current over and above.

$I_f < \Gamma_{thr}^- < 0$

This section explains operation of the inverter leg 32 to switch output potential $V_{out}$ from zero to $+V_{dc}$ where the supply current $I_f$ is negative and is less than a negative threshold current $\Gamma_{thr}^-$ (i.e. operation within zone $\zeta'_1$). (See FIG. 4.)

Figure 7A:
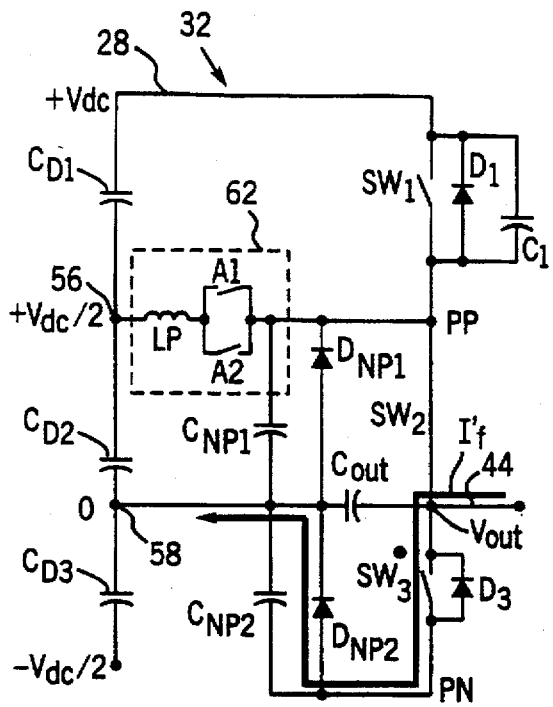
FIGS. 7(a)–7(c) are schematics similar to those in FIG. 6 illustrating the sequence and directions of current flow during a zero to $+V_{dc}$ switching sequence where line current is negative and greater than a negative threshold current.
Figure 7B:
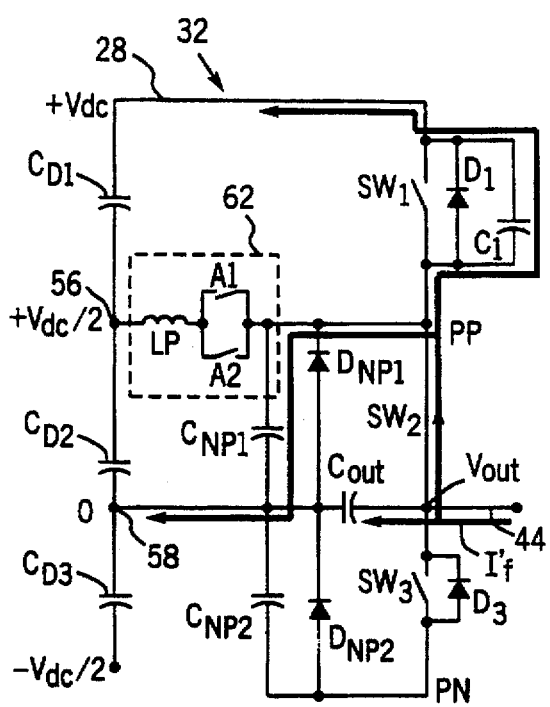

Referring to FIG. 7(a), with the second $SW_2$ and third $SW_3$ main switches closed and a negative line current $I_f$ which is less (i.e. greater magnitude) than the negative threshold current $\Gamma_{thr}^-$ coming into the inverter leg 32, the line current $I_f$ passes through the third main switch $SW_3$ and the second clamping diode $D_{NP2}$ to connect the output line 44 to neutral node 58. At this point the first clamping capacitor, second clamping capacitor $C_{NP2}$ and output capacitor $C_{out}$ are discharged while the first capacitor $C_1$ across the first main switch $SW_1$ is fully charged with $+V_{dc}$ potential. Referring to FIG. 7(b), to discharge the first capacitor $C_1$ and charge the first clamping capacitor $C_{NP1}$, the third main switch $SW_3$ is opened cutting off that path to the negative line current $\Gamma_f$. When the third main switch $SW_3$ is opened, the first $C_{NP1}$ and second $C_{NP2}$ clamping and output $C_{out}$ capacitors act as snubbers and reduce the dv/dt across the third main switch $SW_3$ and consequently minimize power loss.

When the third main switch $SW_3$ is opened, line current $\Gamma_f$ splits between the first clamping capacitor $C_{NP1}$, the output capacitor $C_{out}$, and the first capacitor $C_1$. Current forced up through the first capacitor $C_1$ discharges the first capacitor $C_1$ during the delay period prior to closing the first switch $SW_1$ (during the delay period capacitors $C_{NP1}$ and $C_{out}$ are charging up). When the first capacitor $C_1$ is fully discharged, the first diode $D_1$ clamps node PP and output line 44 to the positive DC rail 28 so that zero potential exists across the first main switch $SW_1$.

Figure 7C:
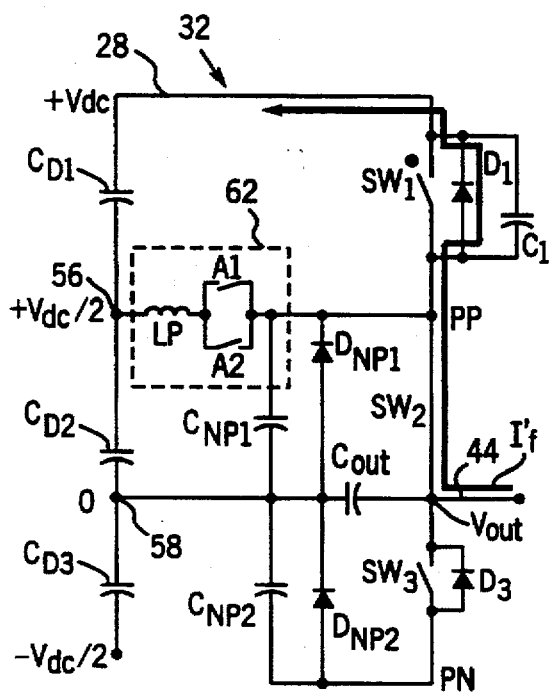

Next, referring to FIG. 7(c), with zero first switch potential $V_{SW1}$, the first main switch $SW_1$ is gated on. In this case, with $\Gamma_f$ negative current will not flow in the unidirectional switches $SW_1$ and $SW_2$. If the load current were to reverse, than $SW_1$ and $SW_2$ would conduct. Thus, the line current $\Gamma_f$ passes through the second diode $D_2$ and through the first diode $D_1$ connecting output line 44 to $+V_{dc}$ as desired.

Hence, where the line current $\Gamma_f$ is less than the negative threshold current $\Gamma_{thr}$, the commutation circuit 62 is preferably not operated during the zero to $+V_{dc}$ switching sequence.

$\Gamma_{thr} < \Gamma_f < 0$

Referring again to FIG. 4, when the inverter leg 32 is operating in zone $\zeta''_1$, where the line current $\Gamma_f$ is negative but is greater than the negative threshold current $\Gamma_{thr}$, the line current $\Gamma_f$ is insufficient alone to discharge the first capacitor $C_1$ within the turn-on delay period. As a consequence, the commutation circuit 62 must be employed to allow zero voltage switching of the first main switch $SW_1$.

Figure 19A:
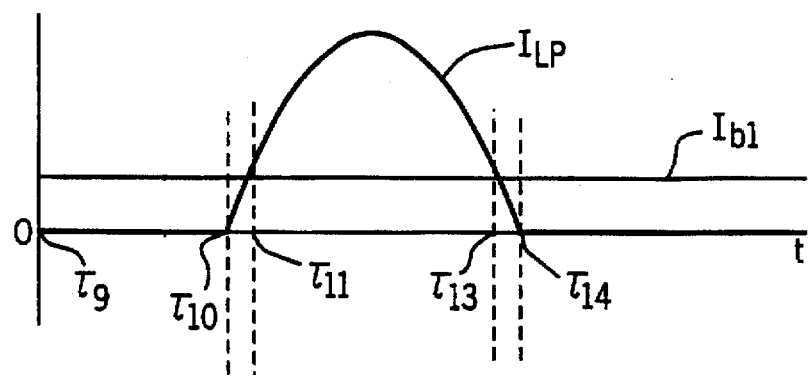
FIG. 19(a) represents an upper inductor current during a zero to $+V_{dc}$ switching sequence wherein the line current is negative and less than a negative threshold current and FIG. 19(b) represents the voltage across and current through the first main switch during a switching sequence corresponding to FIG. 19(a)
Figure 19B:
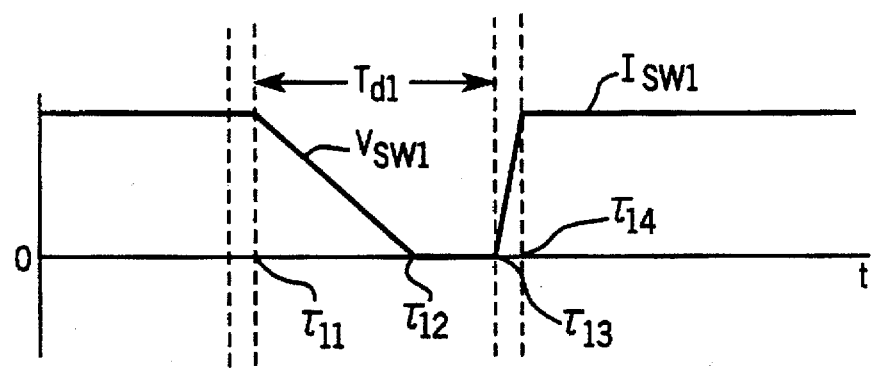

FIGS. 19(a) and 19(b) illustrate waveforms wherein the line current $\Gamma_f$ is less than zero but greater than the negative threshold current $\Gamma_{thr}$ during a zero to $+V_{dc}$ switching sequence. FIG. 19(a) illustrates upper inductor current $I_{LP}$ while FIG. 19(b) illustrates the first main switch voltage $V_{SW1}$ and current $I_{SW1}$. A turn-on delay period between the time when the third main switch $SW_3$ is turned off and the first main switch $SW_1$ is turned on is identified as $T_{d1}$.

Figure 8A:
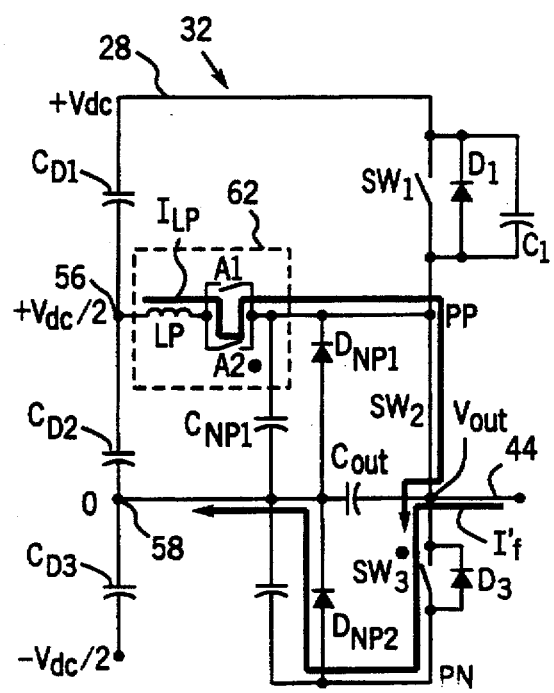
FIGS. 8(a)–8(d) are similar to FIGS. 7(a)–(c) except that they represent a zero to $+V_{dc}$ switching sequence wherein the line current is negative and less than a negative threshold.

Referring again to FIG. 7(a), initially with both the second $SW_2$ and third $SW_3$ main switches closed and a negative line current $\Gamma_f$, the line current $\Gamma_f$ passes through the third main switch $SW_3$ and the second clamping diode $D_{NP2}$ connecting output line 44 to the neutral node 58. This initial state is represented in FIG. 19(a) between times $\tau_9$ and $\tau_{10}$. Referring to FIGS. 8(a) and 19(a), at time $\tau_{10}$, the second auxiliary switch $A_2$ is closed thus providing a $+V_{dc/2}$ potential across the upper inductor LP. The potential across inductor LP provides upper inductor current $I_{LP}$ which flows into node PP and through the third main switch $SW_3$ along with the negative supply current $\Gamma_f$. The inductor current $I_{LP}$ increases linearly until a first boost level $I_{b1}$ is reached. Boost level $I_{b1}$ is the magnitude of current, in addition to the negative line current $\Gamma_f$, which is required to completely discharge the first capacitor $C_1$ during the turn-on delay period $T_{d1}$. Because the inductor current $I_{LP}$ increases linearly, the boost level $I_{b1}$ can be obtained by simply allowing the inductor current $I_{LP}$ to increase for a specific time period. In FIG. 19(a), the period required to provide the boost level $I_{b1}$ is between $\tau_{10}$ and $\tau_{11}$.

Figure 8B:
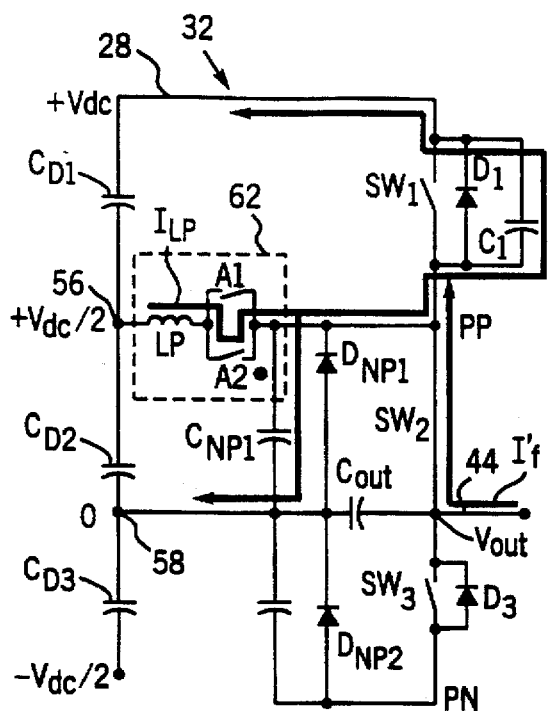

Referring to FIG. 8(b), after the upper inductor current $I_{LP}$ reaches the boost current level $I_{b1}$ at $\tau_{11}$ the third main switch $SW_3$ is opened placing the first capacitor $C_1$, the first clamping capacitor $C_{NP1}$ and output capacitor $C_{out}$ "in series" with the inductor LP. Referring again to FIG. 4, because the line current $\Gamma_f$ may have any value between zero and the negative threshold current $\Gamma_{thr}$ during operation in zone $\zeta''_1$, the boost current $I_{b1}$ should have a magnitude great enough to discharge the first capacitor $C_1$ even where the line current $\Gamma_f$ is minimal (i.e. $\Gamma_f \approx 0$).

Referring to FIG. 19(b) when the third main switch $SW_3$ is opened at time $\tau_{11}$, current flows through and discharges the first capacitor $C_1$. In addition, some current will flow through the first clamping capacitor $C_{NP1}$ and the output capacitor $C_{out}$ charging those capacitors.

Figure 8C:
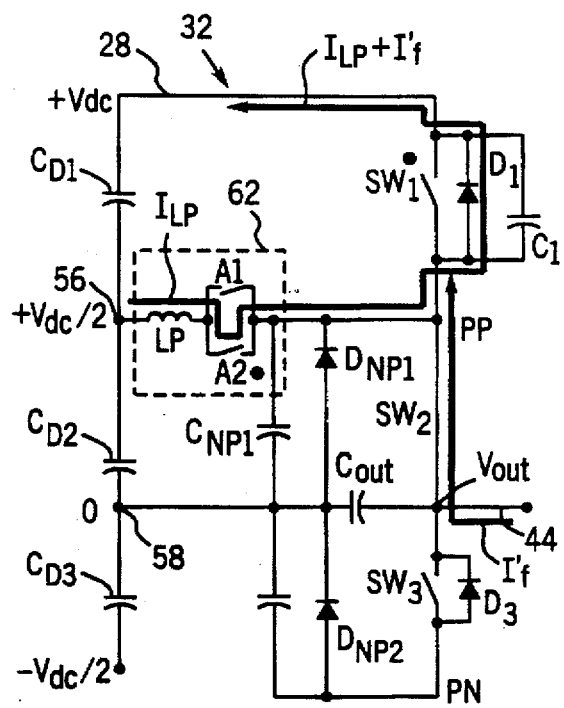
Figure 8D:
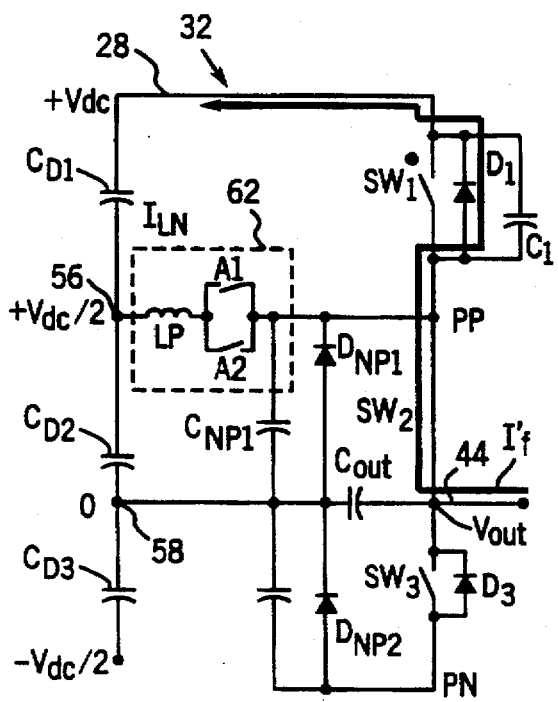

At some time $\tau_{12}$ prior to closing the first main switch $SW_1$, the first capacitor $C_1$ is completely discharged. Referring also to FIG. 8(c), after the first capacitor $C_1$ is completely discharged, the first diode $D_1$ becomes forward biased and clamps zero potential across the first main switch $SW_1$. With zero potential thereacross, the first main switch $SW_1$ is closed at time $\tau_{13}$ and both the line current $\Gamma_f$ and the upper inductor current $I_{LP}$ flow through the first diode $D_1$ back to the positive DC bus 28. Referring to FIG. 8(c) and 19(a), the inductor current $I_{LP}$ eventually resonates through a sinusoidal waveform until time $\tau_{13}$. At that time the first diode $D_1$ is conducting, and a negative $V_{dc/2}$ potential is placed across the upper inductor LP forcing the inductor current $I_{LP}$ to decrease linearly between times $\tau_{13}$ and $\tau_{14}$. Referring also to FIG. 8(d) when the inductor current $I_{LP}$ falls to zero at $\tau_{14}$ the second auxiliary switch $A_2$ turns off so that all of the line current $\Gamma_f$ flows through the first diode $D_1$ connecting output line 44 to $+V_{dc}$.

$\Gamma_f \geq 0$

Here, operation of the inverter leg 32 to switch output potential $V_{out}$ from zero to $+V_{dc}$ where the line current $\Gamma_f$ is positive (i.e. zone $\zeta_2$ operation) is explained in detail.

Figure 20A:
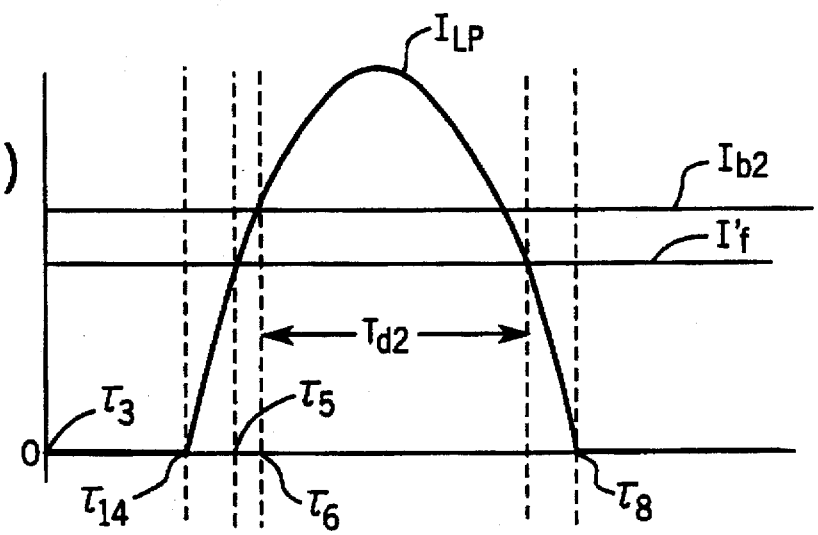
FIGS. 20(a) and 20(b) are similar to FIGS. 19(a) and 19(b) except that they correspond to a zero to $+V_{dc}$ switching sequence wherein the line current is negative.
Figure 20B:
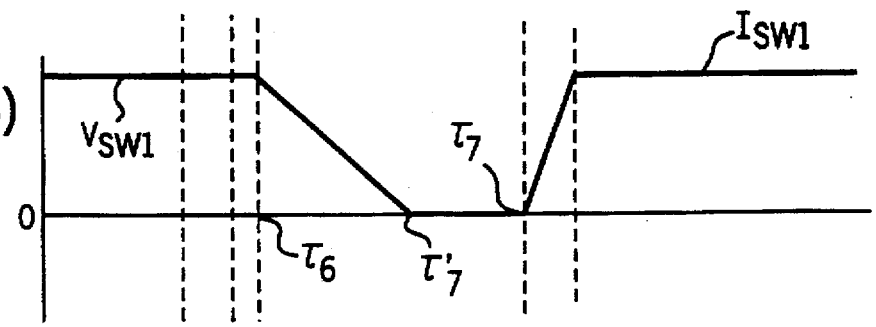

FIGS. 20(a) and 20(b) illustrate waveforms related to inverter leg 32 operation under the aforementioned conditions. FIG. 20(a) illustrates upper inductor current $I_{LP}$ while FIG. 20(b) illustrates first main switch voltage $V_{SW1}$ and current $I_{SW1}$. The delay period is identified as $T_{d2}$.

Figure 9A:
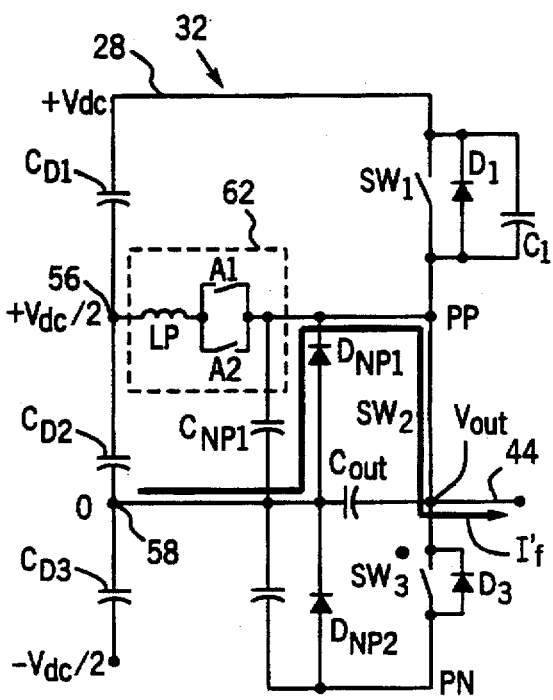
FIGS. 9(a)–9(f) are similar to FIGS. 7(a)–(c) except that they represent a zero to $+V_{dc}$ switching sequence wherein the line current is positive.

Referring to FIGS. 9(a) and 20(a), between $\tau_3$ and $\tau_4$, with the second $SW_2$ and third $SW_3$ main switches closed and a positive line current $\Gamma_f$, line 44 is connected through the second main switch $SW_2$ and the first clamping diode $D_{NP1}$ to neutral node 58 all line current $\Gamma_f$ passing through first clamping diode $D_{NP1}$. Under these conditions the first and second clamping capacitors $C_{NP1}$ and $C_{NP2}$ and the output capacitor $C_{out}$ are all discharged so that the third main switch $SW_3$ can be opened without generating high power loss.

However, prior to closing the first main switch $SW_1$, the first capacitor $C_1$ has a $+V_{dc}$ potential buildup which must be discharged to facilitate zero voltage switching.

Figure 9B:
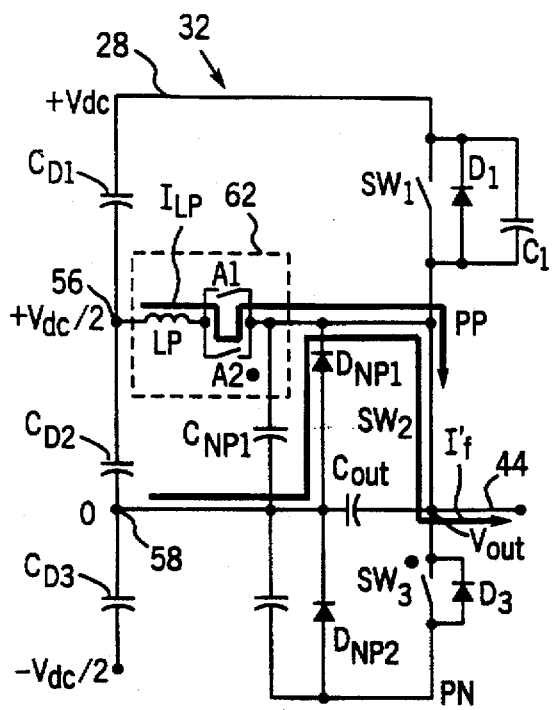
Figure 9C:
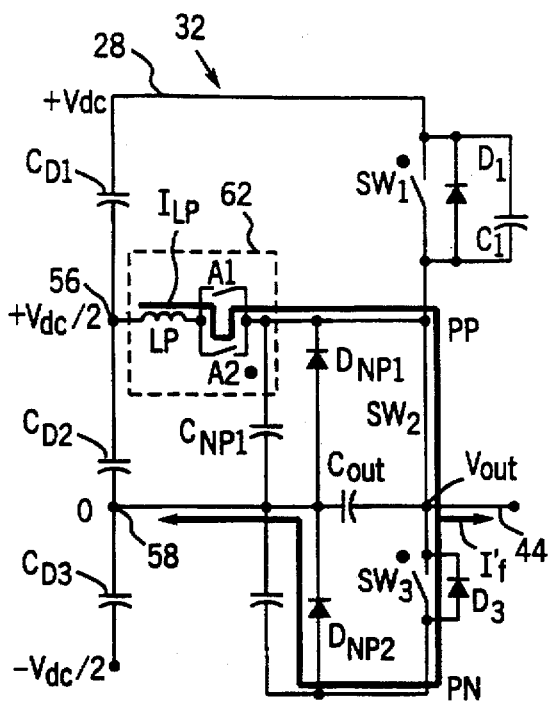

Referring to FIGS. 9(b) and 20(a), to discharge the first capacitor $C_1$, the second auxiliary switch $A_2$ is closed at $\tau_4$ providing a positive $V_{dc/2}$ potential across the upper inductor LP. The $+V_{dc/2}$ potential generates upper inductor current $I_{LP}$ which increases linearly while the third main switch $SW_3$ remains closed. As upper inductor current $I_{LP}$ approaches line current $\Gamma_f$, the inductor current $I_{LP}$ provides an increasing percentage of the line current $\Gamma_f$ thus reducing the current through first clamping diode $D_{NP1}$ until, as seen in FIG. 9(c), the first clamping diode $D_{NP1}$ is turned off at $\tau_5$.

Between times $\tau_5$ and $\tau_6$ the inductor current $I_{LP}$ is allowed to linearly increase further until a second boost current level $I_{b2}$ is reached. The second boost current level $I_{b2}$ is the current level required to compensate for the positive line current and also to discharge the first capacitor $C_1$ during the next delay period. To the extent that the boost current $I_{b2}$ exceeds the line current $I_f$, the excess boost current flows through the third main switch $SW_3$ and the second clamping diode $D_{NP2}$ to neutral node 58.

Figure 9D:
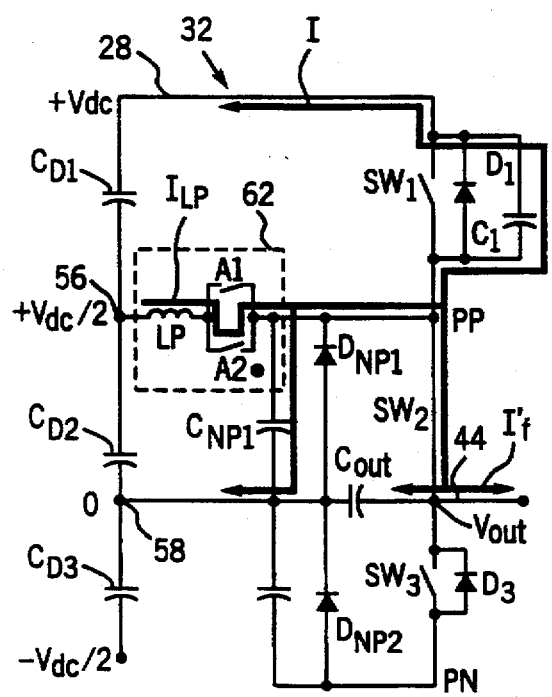

Referring to FIGS. 9(d), 20(a) and 20(b), after boost current level $I_{b2}$ is reached at $\tau_6$, the third main switch $SW_3$ is opened cutting off the current path therethrough and placing the first $C_1$, first clamping $C_{NP1}$, and output $C_{out}$ capacitors in series with inductor LP. Some of the boost current $I_{b1}$ is forced upward through the first capacitor $C_1$, discharging it, and charging capacitors $C_{NP1}$ and $C_{out}$ between $\tau_6$ and $\tau_7$. Preferably, the current is sufficient to discharge the first capacitor $C_1$ by time $\tau'_7$, prior to $\tau_7$. Once the first capacitor $C_1$ is discharged, the first diode $D_1$ is forward biased and clamps the voltage at node PP and output line 44 to $+V_{dc}$ so that the first switch potential $V_{SW1}$ is zero prior to $\tau_7$ and the first switch $SW_1$ is in parallel with a completely discharged capacitor $C_1$.

Figure 9E:
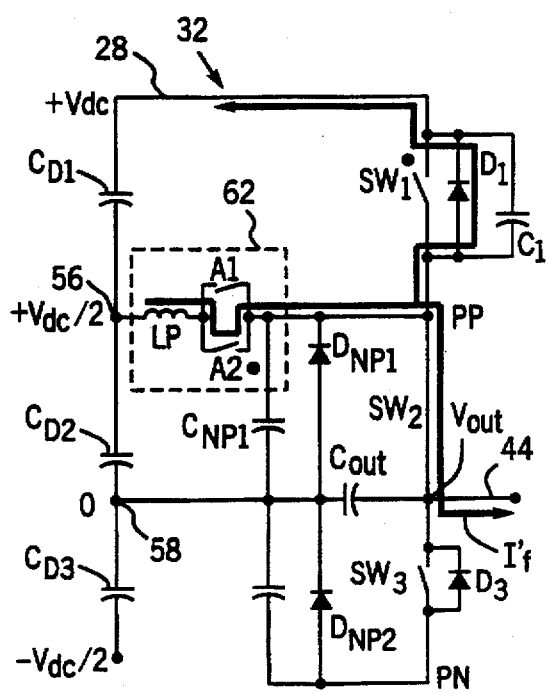

Referring to FIGS. 9(e), 20(a) and 20(b), with no voltage across the first main switch $SW_1$, the first main switch $SW_1$ can be soft switched (i.e. closed) at or prior to time $\tau_7$. With first diode $D_1$ biased on, some inductor current $I_{LP}$ which exceeds the line current $I_f$ passes through the first diode $D_1$ back to the positive DC rail 28. As the upper inductor LP and series capacitors resonate, the upper inductor current $I_{LP}$ eventually decreases and at $\tau_7$ the inductor current $I_{LP}$ again equals the line current $I_f$. When the inductor current $I_{LP}$ falls below the line current $I_f$ at $\tau_7$, the first main switch $SW_1$ conducts as the current in $SW_1$ and $D_1$ combined reverses and begins to provide a portion of the output line current $I_f$. Eventually, referring to FIGS. 9(f) and 20(a), the upper inductor current $I_{LP}$ falls to zero at $\tau_8$ turning off the second auxiliary switch $A_2$ so that all line current $I_f$ is drawn through the first main switch $SW_1$ connecting line 44 to the positive DC rail 28.

$+V_{dc}$ To Zero Switching Sequence

Referring again to FIGS. 4 and 6, during a $+V_{dc}$ to zero switching sequence in zone $\zeta_2$ where the line current $I_f$ is positive and flowing out of the inverter leg 32 via line 44, after the first main switch $SW_1$ is opened and during a turn-on delay period prior to closing the third main switch $SW_3$, the line current $I_f$ flows from neutral node 58 to node $V_{out}$ and tends to discharge the first clamping capacitor $C_{NP1}$ and output capacitor $C_{out}$ as desired. Given an infinite turn-on delay period any magnitude of positive line current $I_f$ would be sufficient to completely discharge the first clamping $C_{NP1}$ and output $C_{out}$ capacitors and allow proper transition. Unfortunately, the turn-on delay period is finite and therefore, there is a positive threshold current $\Gamma^-_{thr}$ defined as the minimum current required to completely discharge the first clamping capacitor $C_{NP1}$ and output capacitor $C_{out}$ prior to the end of a delay period to ensure soft switching of $SW_3$.

When the positive line current $I_f$ has a greater magnitude than the positive threshold current $\Gamma^+_{thr}$, the line current $I_f$ alone can completely discharge the first clamping capacitor $C_{NP1}$ and output capacitor $C_{out}$ in less than a delay period. However, where the positive line current $I_f$ has a magnitude less than the positive threshold current $\Gamma^+_{f}$, the line current $I_f$ must be supplemented to ensure completely discharged first clamping and output capacitors $C_{NP1}$ and $C_{out}$ during a delay period.

Referring still to FIG. 4, during inverter operation in zone $\zeta_2$ the line current $I_f$ has a greater magnitude than the positive threshold current $\Gamma^+_{thr}$ during period $\zeta''_2$ and has a magnitude less than the positive threshold current $\Gamma^+_{thr}$ during period $\zeta'_2$. Therefore during period $\zeta''_2$, the line current $I_f$ need not be supplemented in order to discharge the first clamping and output capacitors $C_{NP1}$ and $C_{out}$. However, during period $\zeta'_2$, the line current $I_f$ must be supplemented.

Referring again to FIG. 4, during a $+V_{dc}$ to zero switching sequence in zone $\zeta_1$ where the line current $I_f$ is negative and flowing into inverter leg 32 via output line 44, after the first main switch $SW_1$ is opened and prior to closing the third main switch $SW_3$, the line current $I_f$ flows from line 44 through the second diode $D_2$ and the first diode $D_1$. At this point, capacitors $C_{NP1}$ and $C_{out}$ are charged. In this case, the line current $I_f$ must be completely compensated for and a boost current (i.e. current above the load current) must be provided which alone can discharge the first clamping $C_{NP1}$ and output $C_{out}$ capacitors and can charge capacitor $C_1$, prior to the end of a delay period.

Hence, there are three separate line current-dependent zones of inverter leg operation for the $+V_{dc}$ to zero switching sequence. In a first zone $\zeta''_2$ the auxiliary circuit 62 is not required. In a second zone $\zeta'_2$, the auxiliary circuit 62 is required to supplement the line current. And in a third zone $\zeta_1$ the auxiliary circuit 62 must both compensate for the line current $I_f$ and provide an additional discharging boost current over and above the line current.

$I_f > I^+_{thr} > 0$

This section explains operation of the inverter leg 32 to switch output potential $V_{out}$ from $+V_{dc}$ to zero where the supply current $I_f$ is positive and is greater than a positive threshold current $\Gamma^+_{thr}$ (i.e. operation within zone $\zeta''_2$). (See FIG. 4.)

Figure 9F:
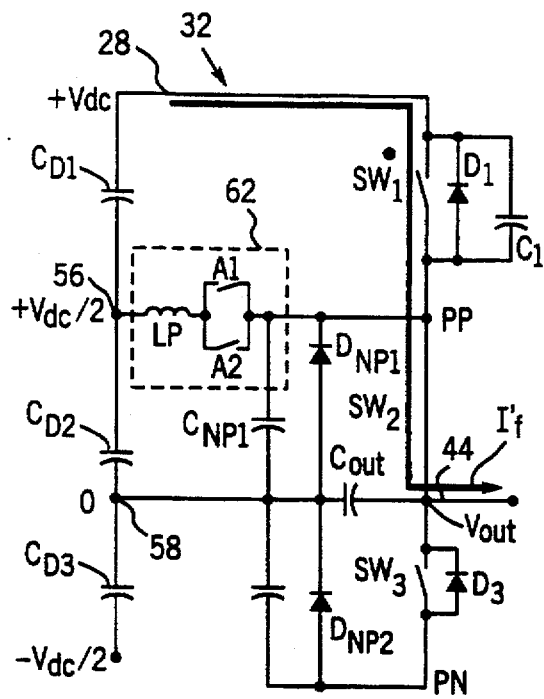
Figure 10A:
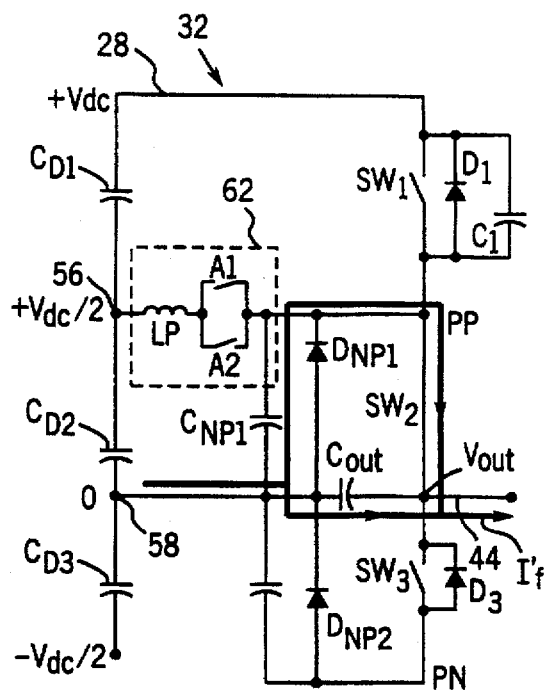
FIGS. 10(a) and 10(b) are schematics illustrating the sequence and direction of current flow during a $+V_{dc}$ zero switching sequence wherein the line current is positive and greater than a positive threshold current.

Referring to FIG. 9(f), with the first $SW_1$ and second $SW_2$ main switches closed and a positive line current $I_f$ which is greater than the positive threshold current $\Gamma^+_{thr}$ flowing out of the inverter leg 32 the line current $I_f$ passes through the second main switch $SW_2$ and the first main switch $SW_1$ connecting the output line 44 to positive rail 28. At this point the first clamping capacitor and output capacitor $C_{out}$ are charged while the first capacitor $C_1$ across the first main switch $SW_1$ is fully discharged. Referring to FIG. 10(a), to discharge the first clamping capacitor $C_{NP1}$ and the output capacitor $C_{out}$, the first main switch $SW_1$ is opened cutting off that path to the positive line current $I_f$. When the first main switch $SW_1$ is opened, the first capacitor $C_1$ acts as a snubber and reduce the dv/dt across the first main switch $SW_1$ and consequently minimize power loss.

When the first main switch $SW_1$ is opened, line current $I_f$ splits between the first clamping capacitor $C_{NP1}$, the output capacitor $C_{out}$, and the first capacitor $C_1$. Current forced through the first capacitor $C_1$ charges the first capacitor $C_1$ during the delay period prior to closing the third switch $SW_3$ (during the delay period capacitors $C_{NP1}$ and $C_{out}$ are discharging). When the first clamping $C_{NP1}$ and output $C_{out}$ capacitors are fully discharged, the first clamping diode $D_{NP1}$ and second clamping diode $D_{NP2}$ clamp node PP and node PN together so that zero potential exists across the third main switch $SW_3$.

Figure 10B:
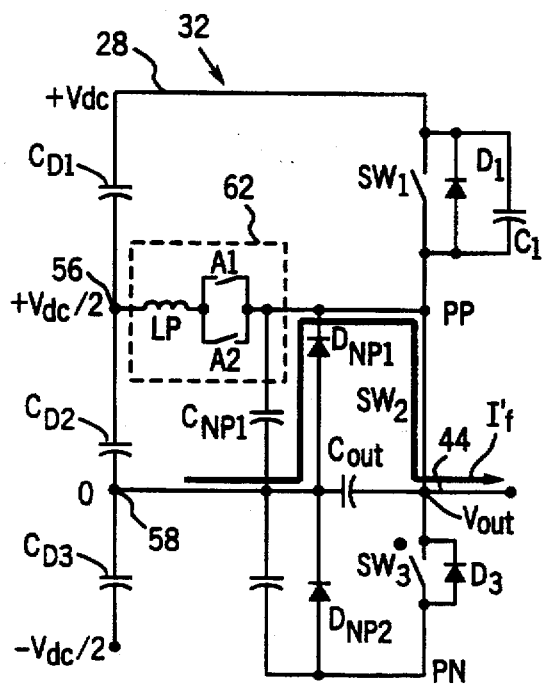

Next, referring to FIG. 10(b), with zero third switch potential $V_{SW3}$, the third main switch $SW_3$ is gated on. In this case, with $I_f$ positive current will not flow in the unidirectional switch $SW_3$. If the load current were to reverse, then $SW_3$ would conduct. Thus, the line current $I_f$ passes through the first clamping diode $D_{NP1}$ and the second main switch $SW_2$ connecting output line 44 to zero as desired.

Hence, where the line current $I_f$ is greater than the positive threshold current $I^+_{thr}$, the commutation circuit 62 is preferably not operated during the $+V_{dc}$ to zero switching sequence.

$I^+_{thr} > I_f > 0$

Referring again to FIG. 4, when the inverter leg 32 is operating in zone $\zeta'_2$, where the line current $I_f$ is positive but is less than the positive threshold current $I^+_{thr}$, the line current $I_f$ is insufficient alone to discharge the first clamping $C_{NP1}$ and output $C_{out}$ capacitors within the turn-on delay period. As a consequence, the commutation circuit 62 must be employed to allow zero voltage switching of the third main switch $SW_3$.

Figure 21A:
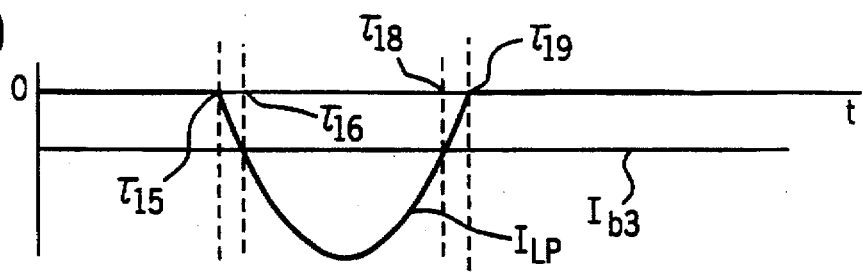
FIGS. 21(a) and 21(b) are similar to FIGS. 19(a) and 19(b) except that they correspond to a $+V_{dc}$ to zero switching sequence wherein the line current is positive.
Figure 21B:
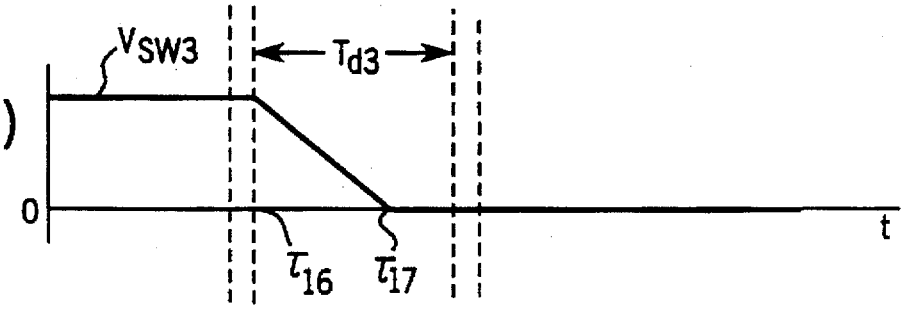

FIGS. 21(a) and 21(b) illustrate waveforms wherein the line current $I_f$ is greater than zero but less than the positive threshold current $I^+_{thr}$ during a $+V_{dc}$ to zero switching sequence. FIG. 21(a) illustrates upper inductor current $I_{LP}$ while FIG. 21(b) illustrates the third main switch voltage $V_{SW3}$. A turn-on delay period between the time when the first main switch $SW_1$ is turned off and the third main switch $SW_3$ is turned on is identified as $T_{d3}$.

Figure 11A:
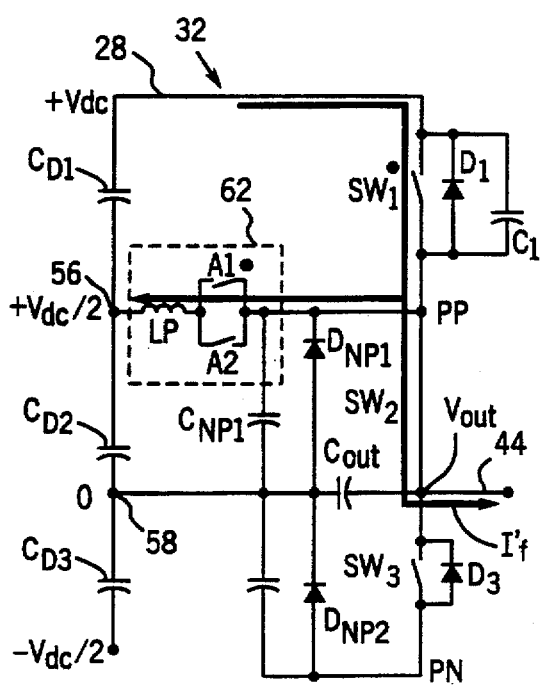
FIGS. 11(a)–11(d) are similar to FIGS. 10(a) and 10(b) except that they present a $+V_{dc}$ to zero switching sequence wherein the line current is positive and less than a positive threshold current.

Referring again to FIG. 9(f), initially with both the first $SW_2$ and second $SW_2$ main switches closed and a positive line current $I_f$, the line current $I_f$ passes through the first main switch $SW_1$ and second main switch $SW_2$ connecting output line 44 to the positive rail 28. This initial state is represented in FIG. 21(a) prior to time $\tau_{15}$. Referring to FIGS. 11(a) and 21(a), at time $\tau_{15}$, the first auxiliary switch $A_1$ is closed thus providing a $-V_{dc/2}$ potential across the upper inductor LP. The potential across inductor LP draws upper inductor current $I_{LP}$ through node PP and through the first main switch $SW_1$ along with the positive supply current $I_f$. The inductor current $I_{LP}$ increases linearly until a third boost level $I_{b3}$ is reached. Boost level $I_{b3}$ is the magnitude of current, in addition to the positive line current $I_f$, which is required to completely discharge the first clamping $C_{NP1}$ and output $C_{out}$ capacitors and charge the first capacitor $C_1$ during the turn-on delay period $T_{d3}$. Because the inductor current $I_{LP}$ increases linearly, the boost level $I_{b3}$ can be obtained by simply allowing the inductor current $I_{LP}$ to increase for a specific time period. In FIG. 21(a), the period required to provide the boost level $I_{b3}$ is between $\tau_{15}$ and $\tau_{16}$.

Figure 11B:
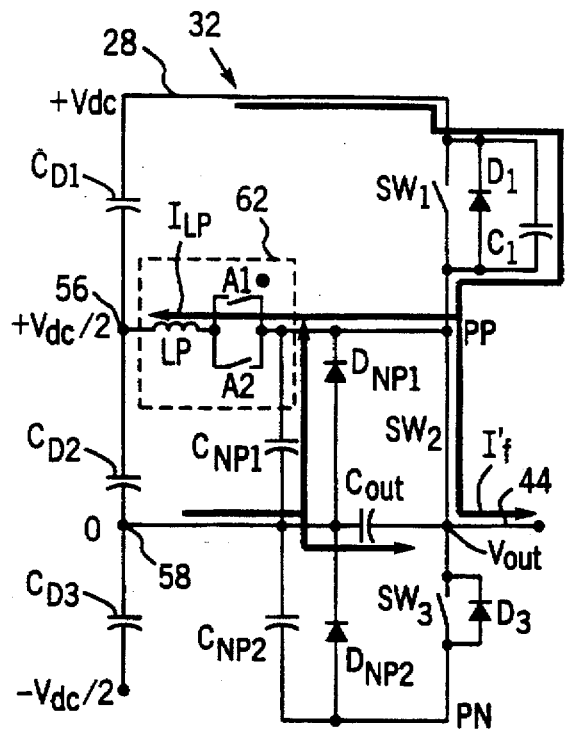

Referring to FIG. 11(b), after the upper inductor current $I_{LP}$ reaches the boost current level $I_{b3}$ at $\tau_{16}$ the first main switch $SW_1$ is opened placing the first capacitor $C_1$, the first clamping capacitor $C_{NP1}$ and output capacitor $C_{out}$ "in series" with the inductor LP. Referring again to FIG. 4, because the line current $I_f$ may have any value between zero and the positive threshold current $I^+_{thr}$ during operation in zone $\tau'_2$, the boost current $I_{b3}$ should have a magnitude great enough to discharge the first clamping and output capacitors $C_{NP1}$ and $C_{out}$ even where the line current $I_f$ is minimal (i.e. $I_f \approx 0$).

Referring to FIG. 21(b) when the first main switch $SW_1$ is opened at time $\tau_{16}$, current flows through and discharges the first clamping and output capacitors $C_{NP1}$ and $C_{out}$. In addition, some current will flow through the first capacitor $C_1$ charging that capacitor.

Figure 11C:
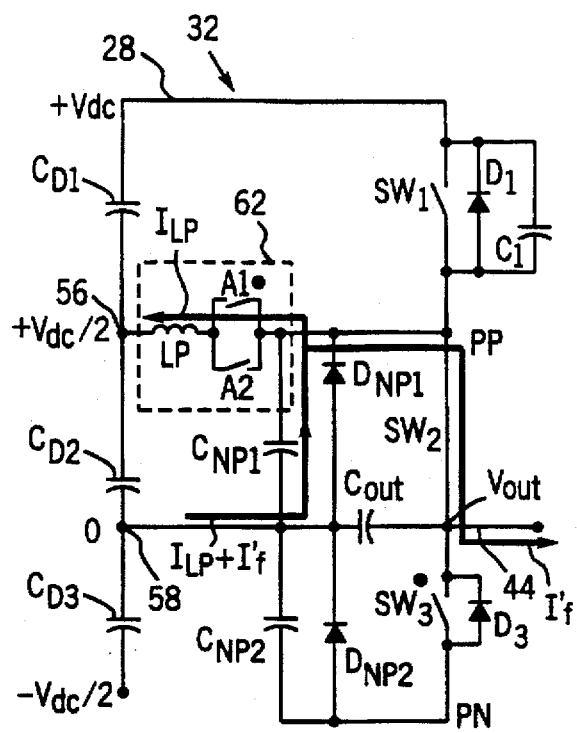
Figure 11D:
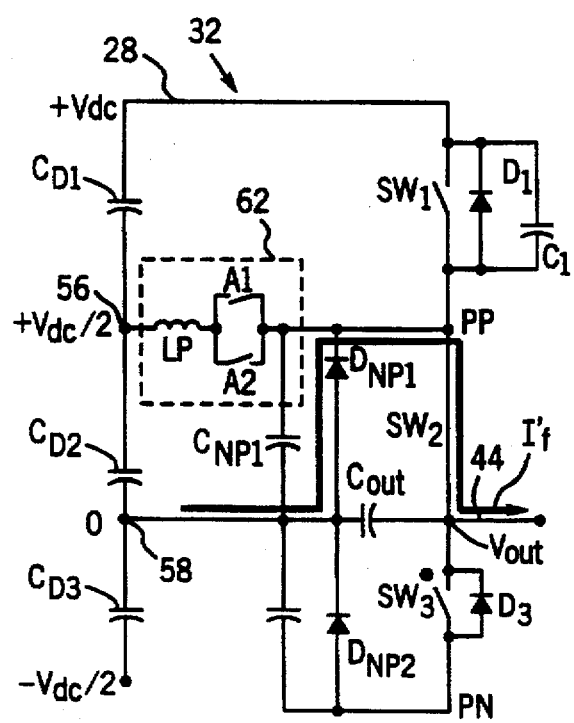

At some time $\tau_{17}$ prior to closing the third main switch $SW_3$, the first clamping and output capacitors $C_{NP1}$ and $C_{out}$ are completely discharged. Referring also to FIG. 11(c), after the first clamping and output capacitors $C_{NP1}$ and $C_{out}$ are completely discharged, the first clamping diode $D_{NP1}$ becomes forward biased and clamps zero potential across the third main switch $SW_3$. With zero potential thereacross, the third main switch $SW_3$ is closed at time $\tau_{18}$ and both the line current $I_f$ and the upper inductor current $I_{LP}$ flow through diode $D_{NP1}$ from zero. Referring to FIG. 11(c) and 21(a), the inductor current $I_{LP}$ eventually resonates through a sinusoidal waveform until time $\tau_{18}$. At that time the first clamping diode $D_{NP1}$ is conducting, and a positive $V_{dc/2}$ potential is placed across the upper inductor LP forcing the inductor current $I_{LP}$ to decrease linearly between times $\tau_{18}$ and $\tau_{19}$. Referring also to FIG. 11(d) when the inductor current $I_{LP}$ falls to zero at $\tau_{19}$ the first auxiliary switch $A_1$ turns off so that all of the line current $I_f$ flows through the first clamping diode $D_{NP1}$ connecting output line 44 to neutral node 58.

$I_f < 0$

Here, operation of the inverter leg 32 to switch output potential $V_{out}$ from $+V_{dc}$ to zero where the line current $I_f$ is negative (i.e. zone $\zeta_1$ operation) is explained in detail.

Figure 22A:
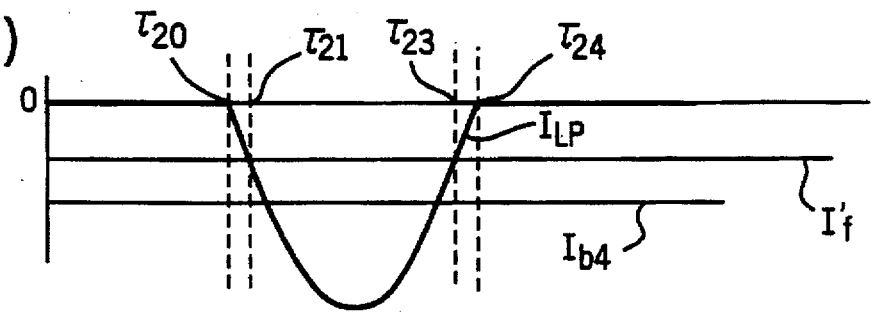
FIGS. 22(a) and 22(b) are similar to FIGS. 19(a) and 19(b) except that they correspond to a $+V_{dc}$ to zero switching sequence wherein the line current is negative.
Figure 22B:
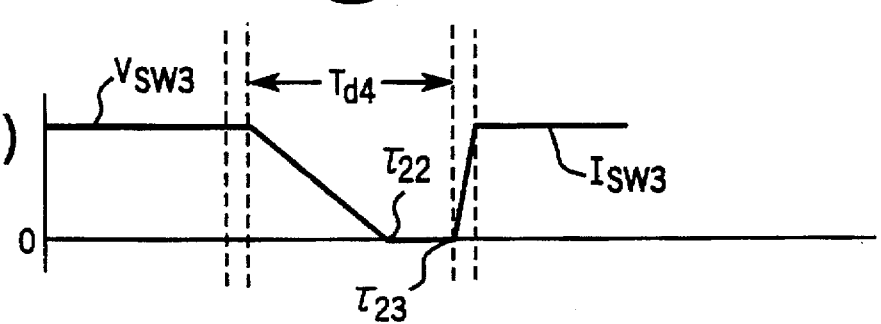

FIGS. 22(a) and 22(b) illustrate waveforms related to inverter leg 32 operation under the aforementioned conditions. FIG. 20(a) illustrates upper inductor current $I_{LP}$ while FIG. 20(b) illustrates third main switch voltage $V_{SW3}$ and current $I_{SW3}$. The delay period is identified as $T_{d4}$.

Referring to FIGS. 8(d) and 22(a), prior to time $\tau_{20}$, with the first $SW_1$ and second $SW_2$ main switches closed and a negative line current $I_f$, line 44 is connected through the first $D_1$ and second $D_2$ diodes to the positive DC rail 28. Under these conditions the first main capacitor $C_1$ is discharged so that the first main switch $SW_1$ can be opened without generating high power loss.

However, prior to closing the third main switch $SW_3$, the first clamping $C_{NP1}$ and output $C_{out}$ capacitors have a $+V_{dc}$ potential buildup which must be discharged to facilitate zero voltage switching.

Figure 12A:
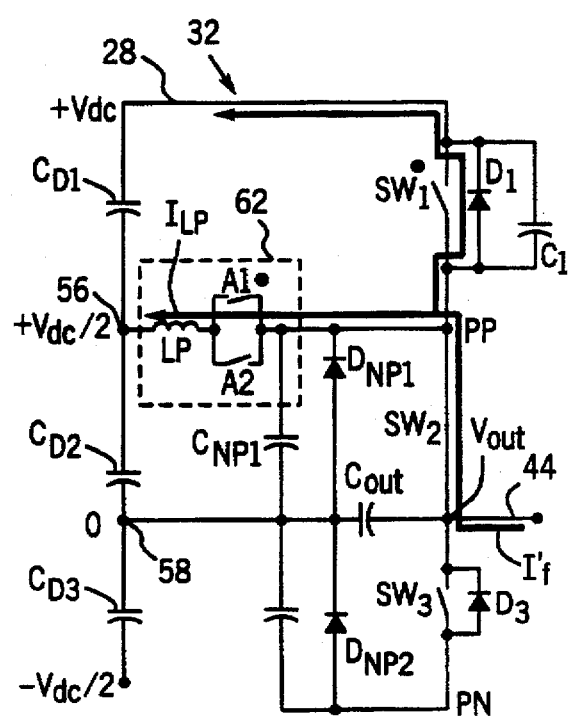
FIGS. 12(a)–12(d) are similar to FIGS. 10(a) and 10(b) except that they represent a $+V_{dc}$ to zero switching sequence wherein the line current is negative.
Figure 12B:
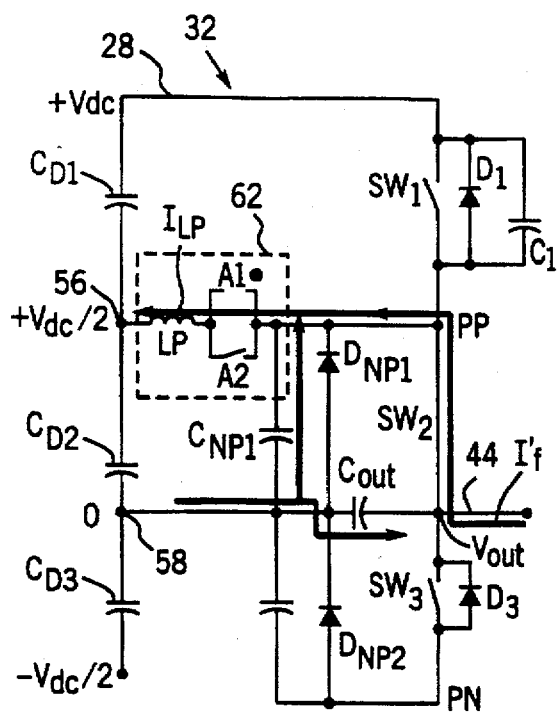
Figure 12C:
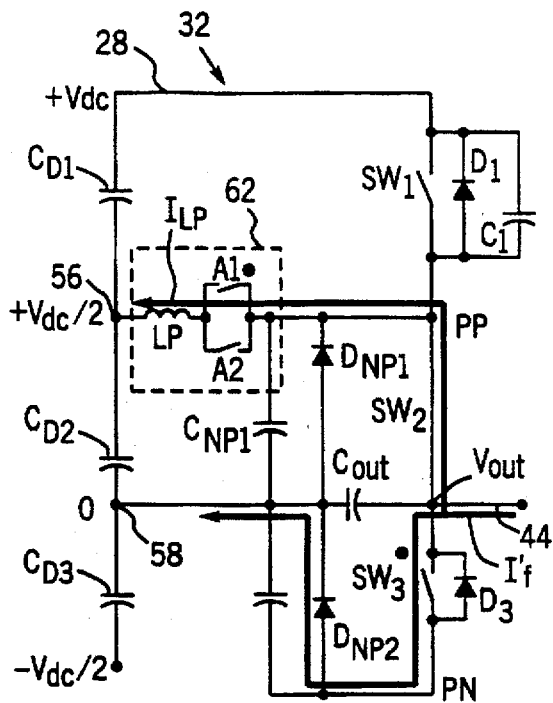

Referring to FIGS. 12(b) and 22(a), to discharge the first clamping $C_{NP1}$ and output $C_{out}$ capacitors the first auxiliary switch $A_1$ is closed at $\tau_{20}$ providing a negative $V_{dc/2}$ potential across the upper inductor LP. The $-V_{dc/2}$ potential generates upper inductor current $I_{LP}$ which increases linearly while the first main switch $SW_1$ remains closed. As upper inductor current $I_{LP}$ approaches line current $I_f$, the inductor current $I_{LP}$ sinks an increasing percentage of the line current $I_f$ thus reducing the current through first diode $D_1$ until, as seen in FIG. 12(c), the first diode $D_1$ is turned off at $\tau_{21}$.

Between times $\tau_{21}$ and $\tau_{22}$ the inductor current $I_{LP}$ is allowed to linearly increase further until a fourth boost current level $I_{b4}$ is reached. The fourth boost current level $I_{b4}$ is the current level required to compensate for the negative line current and also to discharge the first clamping $C_{NP1}$ and output $C_{out}$ capacitors during the next delay period. To the extent that the boost current $I_{b4}$ exceeds the line current $I_f$, the excess boost current flows through the first diode $D_1$.

Referring to FIGS. 12(b), 22(a) and 22(b), after boost current level $I_{b4}$ is reached at $\tau_{21}$, the first main switch $SW_1$ is opened cutting off the current path therethrough and placing the first $C_1$, first clamping $C_{NP1}$, and output $C_{out}$ capacitors in series with inductor LP. Some of the boost current $I_{b4}$ is forced down through capacitors $C_{NP1}$ and $C_{out}$ between $\tau_{21}$ and $\tau_{22}$ discharging those capacitors.

Preferably, the current is sufficient to discharge the first clamping $C_{NP1}$ and output $C_{out}$ capacitors by time $\tau_{22}$, prior to $\tau_{23}$. Once the first clamping $C_{NP1}$ and output $C_{out}$ capacitors are discharged, the first $D_{NP1}$ and second $D_{NP2}$ clamping diodes are forward biased and clamp the voltage at node PN to node PP so that the third switch potential $V_{SW3}$ is zero prior to $\tau_{23}$ and the third switch $SW_3$ is in parallel with a completely discharged capacitor bank $C_{out}$, $C_{NP1}$ and $C_{NP2}$.

Figure 12D:
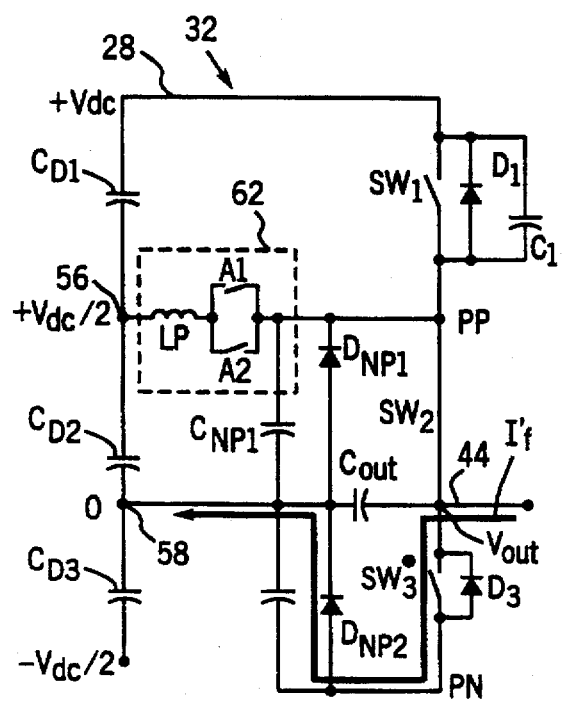

Referring to FIGS. 12(c), 22(a) and 22(b), with no voltage across the third main switch $SW_3$, the third main switch $SW_3$ can be soft switched (i.e. closed) at or prior to time $\tau_{23}$. With the second clamping diode $D_{NP2}$ biased on, some inductor current $I_{LP}$ which exceeds the line current $I_f$ passes through the diode $D_{NP2}$ back to neutral node 58. As the upper inductor LP and series capacitors resonate, the upper inductor current $I_{LP}$ eventually decreases and the inductor current $I_{LP}$ again equals the line current $I_f$. When the inductor current $I_{LP}$ falls below the line current $I_f$ at $\tau_{23}$, the third main switch $SW_3$ conducts as the current in $SW_3$ begins to sink a portion of the output line current $I_f$. Eventually, referring to FIGS. 12(d) and 22(a), the upper inductor current $I_{LP}$ falls to zero at $\tau_{24}$ turning off the first auxiliary switch $A_1$ so that all line current $I_f$ flows through the third main switch $SW_3$ connecting line 44 to the neutral node 58.

Zero To $-V_{dc}$ Switching Sequence

Referring again to FIGS. 4 and 6, during a zero to $-V_{dc}$ switching sequence in zone $\zeta_3$, where the line current $I_f$ is positive and flowing out of the inverter leg 32 via line 44, after the second main switch $SW_2$ is opened and during a turn-on delay period prior to closing the fourth main switch $SW_4$, some of the line current $I_f$ flows up through the fourth capacitor $C_4$ and tends to discharge the fourth capacitor $C_4$ as desired and then biases the fourth diode $D_4$ on clamping zero voltage across the fourth main switch $SW_4$. Given an infinite turn-on delay period, any magnitude of positive line current $I_f$ would be sufficient to completely discharge the fourth capacitor $C_4$ and allow proper transition. Unfortunately, the turn-on delay period is finite and therefore, there is a positive threshold current $I^+_{thr}$ defined as the minimum current required to completely discharge the fourth capacitor $C_4$ prior to the end of the finite delay period to ensure soft switching of $SW_4$.

When the positive line current $I_f$ has a greater magnitude than the positive threshold current $I^+_{thr}$ the line current $I_f$ alone can completely discharge the fourth capacitor $C_4$ in less than a delay period. However where the positive line current $I_f$ has a magnitude less than the positive threshold current $I^+_{thr}$, the line current $I_f$ must be supplemented to ensure a completely discharged fourth capacitor $C_4$ during a delay period.

Referring still to FIG. 4, during inverter operation in zone $\zeta_3$ the line current $I_f$ has a greater magnitude than the positive threshold current $I^+_{thr}$ during period $\zeta'_3$ and has a magnitude less than the positive threshold current $I^+_{thr}$ during period $\zeta''_3$. Therefore, during period $\zeta'_3$, the line current $I_f$ need not be supplemented in order to discharge the fourth capacitor $C_4$. However, during period $\zeta''_3$, the line current $I_f$ must be supplemented.

Referring again to FIG. 4, during a zero to $-V_{dc}$ switching sequence in zone $\zeta_4$ where the line current $I_f$ is negative and flowing into inverter leg 32 via output line 44, after the second main switch $SW_2$ is opened and prior to closing the fourth main switch $SW_4$, the line current $I_f$ passes through the third main switch $SW_3$ and second clamping diode $D_{NP2}$ connecting $V_{out}$ to neutral node 58. At this point the fourth capacitor $C_4$ is charged with $-V_{dc}$ volts. In this case, the line current $I_f$ must be completely compensated for and a boost current (i.e. current above the load current) must be provided which alone can discharge the fourth capacitor $C_4$ prior to the end of a delay period.

Hence, there are three separate line current-dependent zones of inverter leg operation for the zero to $-V_{dc}$ switching sequence. In a first zone $\zeta'_3$ the auxiliary circuit 64 is not required. In a second zone $\zeta''_3$, the auxiliary circuit 64 is required to supplement the line current. And in a third zone $\zeta_4$ the auxiliary circuit 64 must both compensate for the line current $I_f$ and provide an additional discharging boost current over and above the line current.

$I_f > I_{thr}^+ > 0$

This section explains operation of the inverter leg 32 to switch output potential $V_{out}$ from zero to $-V_{dc}$ where the supply current $I_f$ is positive and is greater than a positive threshold current $I^+_{thr}$ (i.e. operation within zone $\zeta'_3$). (See FIG. 4.)

Figure 13A:
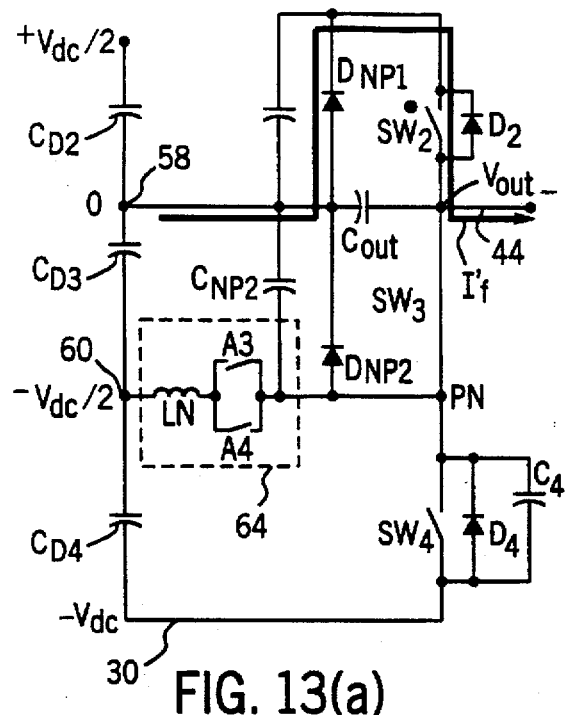
FIGS. 13(a)–13(c) illustrate the sequence and direction of current flow during a zero to $-V_{dc}$ switching sequence wherein the line current is positive and greater than a positive threshold current.
Figure 13B:
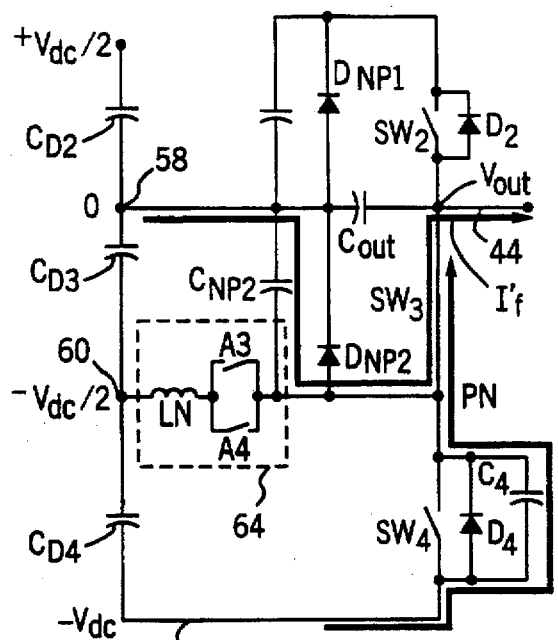

Referring to FIG. 13(a), with the second $SW_2$ and third $SW_3$ main switches closed and a positive line current $I_f$ which is greater than the positive threshold current $I^+_{thr}$ flowing out of inverter leg 32, the line current $I_f$ passes through the first clamping diode $D_{NP1}$ and the second main switch $SW_2$ to connect the output line 44 to neutral node 58. At this point the first clamping capacitor $C_{NP1}$, second clamping capacitor $C_{NP2}$ and output capacitor $C_{out}$ are discharged while the fourth capacitor $C_4$ across the fourth main switch $SW_4$ is fully charged with $-V_{dc}$ potential. Referring to FIG. 13(b), to discharge the fourth capacitor $C_4$ the second main switch $SW_2$ is opened cutting off that path for the positive line current $I_f$. When the second main switch $SW_2$ is opened, the first clamping $C_{NP1}$, second clamping $C_{NP2}$ and output $C_{out}$ capacitors act as snubbers and reduce the dv/dt across the second main switch $SW_2$ and consequently minimize power loss.

When the second main switch $SW_2$ is opened, line current $I_f$ splits between the second clamping capacitor $C_{NP2}$, the output capacitor $C_{out}$, and the fourth capacitor $C_4$. Current drawn through the fourth capacitor $C_4$ discharges the fourth capacitor $C_4$ during the delay period prior to closing the fourth switch $SW_4$ (during the delay period capacitors $C_{NP2}$ and $C_{out}$ are charging up). When the fourth capacitor $C_4$ is fully discharged, the fourth diode $D_4$ clamps node PN and output line 44 to the negative DC rail 30 so that zero potential exists across the fourth main switch $SW_4$.

Figure 13C:
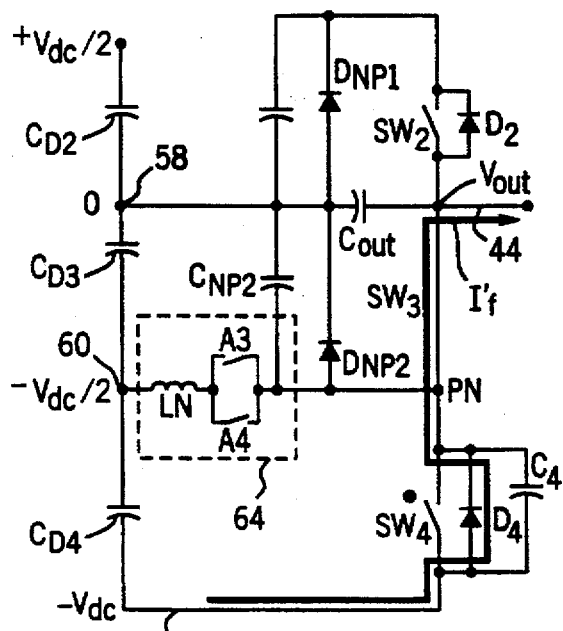

Next, referring to FIG. 13(c), with zero fourth switch potential $V_{SW4}$, the fourth main switch $SW_4$ is gated on. In this case, with $I_f$ positive current will not flow in the unidirectional switches $SW_3$ and $SW_4$. The line current $I_f$ passes through the fourth diode $D_4$ and through the third diode $D_3$ connecting output line 44 to $-V_{dc}$ as desired.

Hence, where the line current $I_f$ is greater than the positive threshold current $I^+_{thr}$, the commutation circuit 64 is preferably not operated during the zero to $-V_{dc}$ switching sequence.

$I_{thr}^+ > I_f > 0$

Referring again to FIG. 4, when the inverter leg 32 is operating in zone $\zeta''_3$, where the line current $I_f$ is positive but is less than the positive threshold current $I^+_{thr}$, the line current $I_f$ is insufficient alone to discharge the fourth capacitor $C_4$ within the turn-on delay period. As a consequence, the commutation circuit 64 must be employed to allow zero voltage switching of the fourth main switch $SW_4$.

Figure 23A:
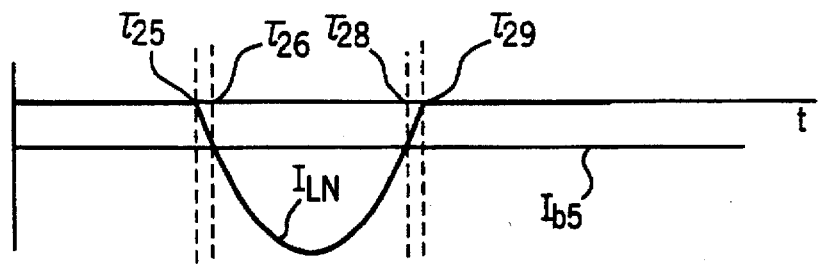
FIGS. 23(a) and 23(b) are similar to FIGS. 19(a) and 19(b) except that they correspond to a zero to $-V_{dc}$ to zero switching sequence wherein the line current is positive and less than a positive threshold current.
Figure 23B:
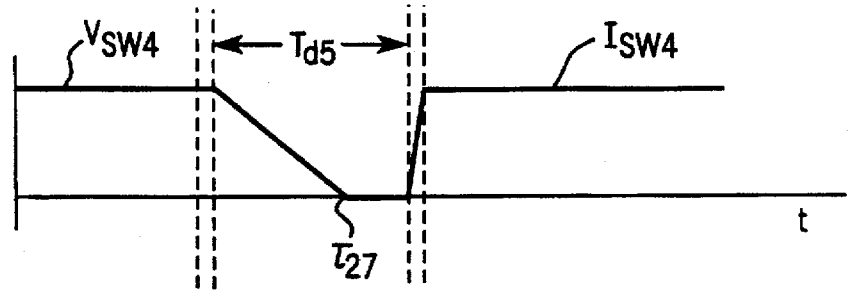

FIGS. 23(a) and 23(b) illustrate waveforms wherein the line current $I_f$ is greater than zero but less than the positive threshold current $I^+_{thr}$ during a zero to $-V_{dc}$ switching sequence. FIG. 23(a) illustrates lower inductor current $I_{LN}$ while FIG. 23(b) illustrates the fourth main switch voltage $V_{SW4}$ and current $I_{SW4}$. A turn-on delay period between the time when the second main switch $SW_2$ is turned off and the fourth main switch $SW_4$ is turned on is identified as $T_{d5}$.

Figure 14A:
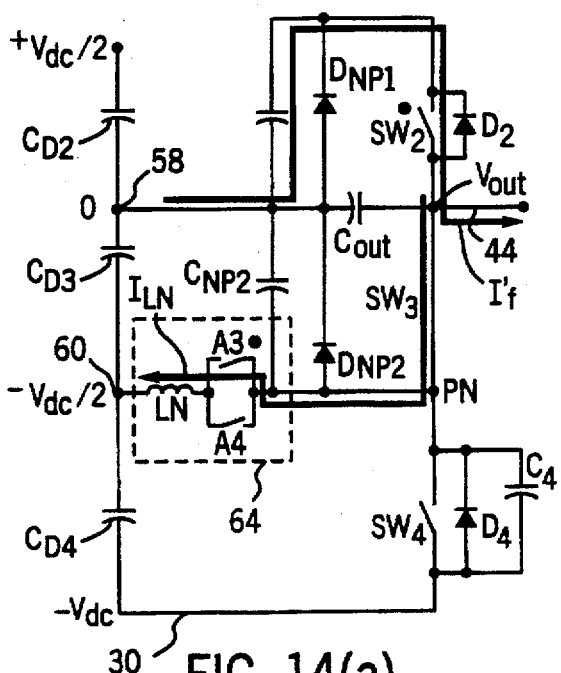
FIGS. 14(a)–14(d) are similar to FIGS. 13(a)–13(c) except that they represent the zero to $-V_{dc}$ switching sequence wherein the line current is positive and less than a positive threshold current.

Referring again to FIG. 13(a), initially with both the second $SW_2$ and third $SW_3$ main switches closed and a positive line current $I_f$, the line current $I_f$ passes through the first clamping diode $D_{NP1}$ and the second main switch $SW_2$ connecting output line 44 to the neutral node 58. This initial state is represented in FIG. 23(a) prior to time $\tau_{25}$. Referring to FIGS. 14(a) and 23(a), at time $\tau_{26}$, the third auxiliary switch $A_3$ is closed thus providing a $+V_{dc/2}$ potential across the lower inductor LN. The potential across inductor LN sinks lower inductor current $I_{LN}$ which flows out of node PN and through the second main switch $SW_2$ along with the negative supply current $I_f$. The inductor current $I_{LN}$ increases linearly until a fifth boost level $I_{b5}$ is reached. Boost level $I_{b5}$ is the magnitude of current, in addition to the positive line current $I_f$, which is required to completely discharge the fourth capacitor $C_4$ during the turn-on delay period $T_{d5}$. Because the inductor current $I_{LN}$ increases linearly, the boost level $I_{b5}$ can be obtained by simply allowing the inductor current $I_{LN}$ to increase for a specific time period. In FIG. 23(a), the period required to provide the boost level $I_{b5}$ is between $\tau_{25}$ and $\tau_{26}$.

Figure 14B:
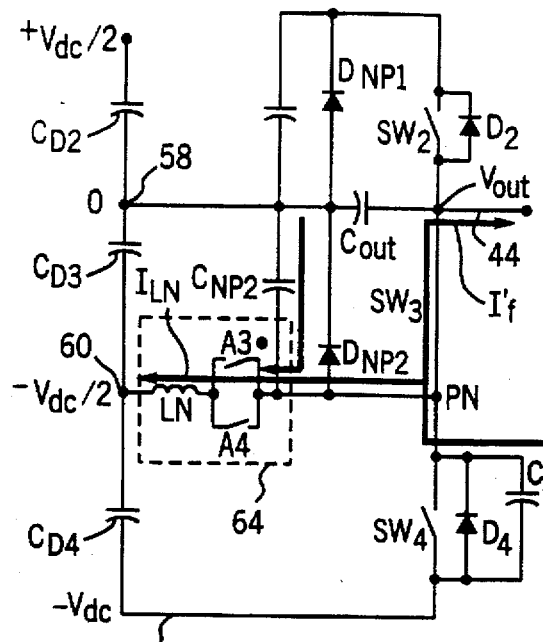

Referring to FIG. 14(b), after the lower inductor current $I_{LN}$ reaches the boost current level $I_{b5}$ at $\tau_{27}$ the second main switch $SW_2$ is opened placing the fourth capacitor $C_4$, the second clamping capacitor $C_{NP2}$ and output capacitor $C_{out}$ "in series" with the inductor LN. Referring again to FIG. 4, because the line current $I_f$ may have any value between zero and the positive threshold current $I^+_{thr}$ during operation in zone $\tau''_3$, the boost current $I_{b5}$ should have a magnitude great enough to discharge the fourth capacitor $C_4$ even where the line current $I_f$ is minimal (i.e. $I_f \approx 0$).

Referring to FIG. 23(b) when the second main switch $SW_2$ is opened at time $\tau_{26}$, current flows through and discharges the second capacitor $C_4$. In addition, some current will flow through the second clamping capacitor $C_{NP2}$ and the output capacitor $C_{out}$ charging those capacitors.

Figure 14C:
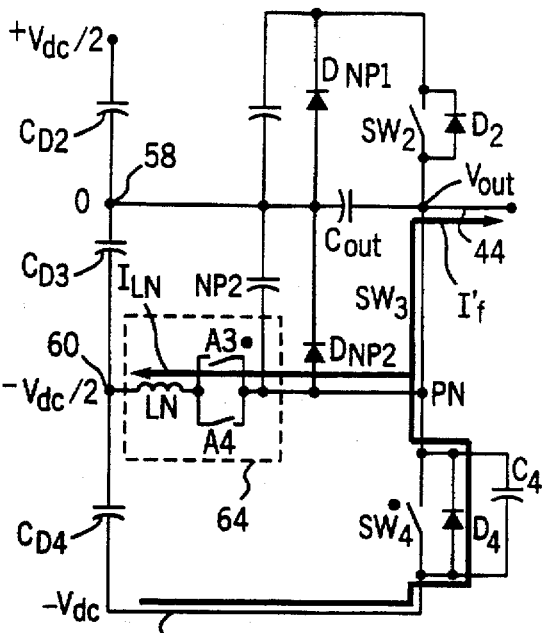
Figure 14D:
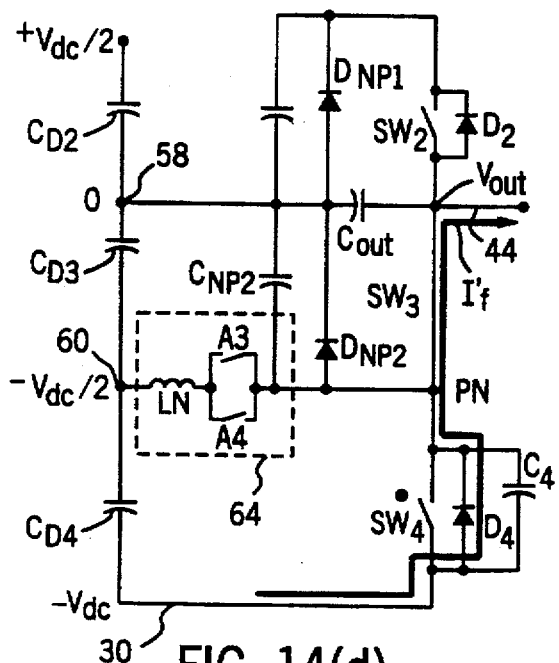

At some time $\tau_{27}$ prior to closing the fourth main switch $SW_4$, the fourth capacitor $C_4$ is completely discharged. Referring also to FIG. 14(c), after the fourth capacitor $C_4$ is completely discharged, the fourth diode $D_4$ becomes forward biased and clamps zero potential across the fourth main switch $SW_4$. With zero potential thereacross, the fourth main switch $SW_4$ is closed at time $\tau_{28}$ and both the line current $I_f$ and the lower inductor current $I_{LN}$ flow through the fourth diode $D_4$ from the negative DC bus 30. Referring to FIG. 14(c) and 23(a), the inductor current $I_{LN}$ eventually resonates through a sinusoidal waveform until time $\tau_{28}$. At that time the fourth diode $D_4$ is conducting, and a negative $V_{dc/2}$ potential is placed across the lower inductor LN forcing the inductor current $I_{LN}$ to decrease linearly between times $\tau_{28}$ and $\tau_{29}$. Referring also to FIG. 14(d) when the inductor current $I_{LN}$ falls to zero at $\tau_{29}$ the third auxiliary switch $A_3$ turns off so that all of the line current $I_f$ flows through the fourth diode $D_4$ connecting output line 44 to $-V_{dc}$.

$I_f < 0$

Here, operation of the inverter leg 32 to switch output potential $V_{out}$ from zero to $-V_{dc}$ where the line current $I_f$ negative (i.e. zone $\zeta_4$ operation) is explained in detail.

Figure 24A:
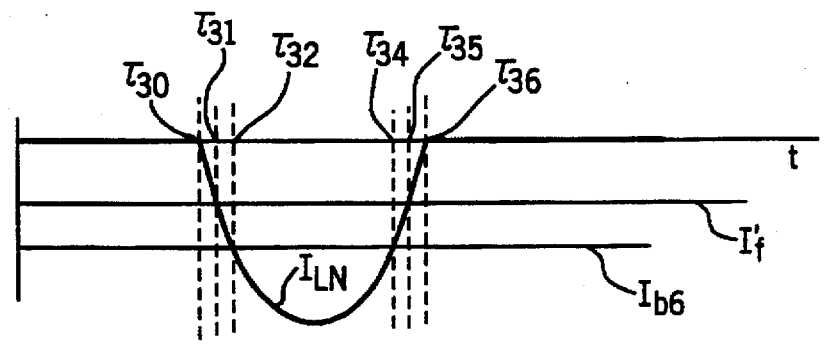
FIGS. 24(a) and 24(b) are similar to FIGS. 19(a) and 19(b) except that they correspond to a $-V_{dc}$ to zero switching sequence wherein the line current is negative.
Figure 24B:
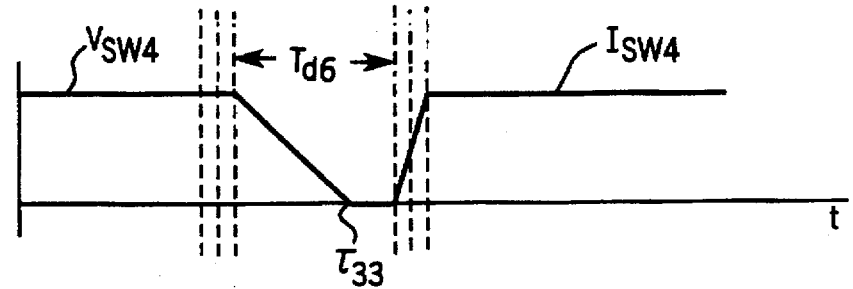

FIGS. 24(a) and 24(b) illustrate waveforms related to inverter leg 32 operation under the aforementioned conditions. FIG. 24(a) illustrates lower inductor current $I_{LN}$ while FIG. 24(b) illustrates fourth main switch voltage $V_{SW4}$ and current $I_{SW4}$. The delay period is identified as $T_{d6}$.

Figure 15A:
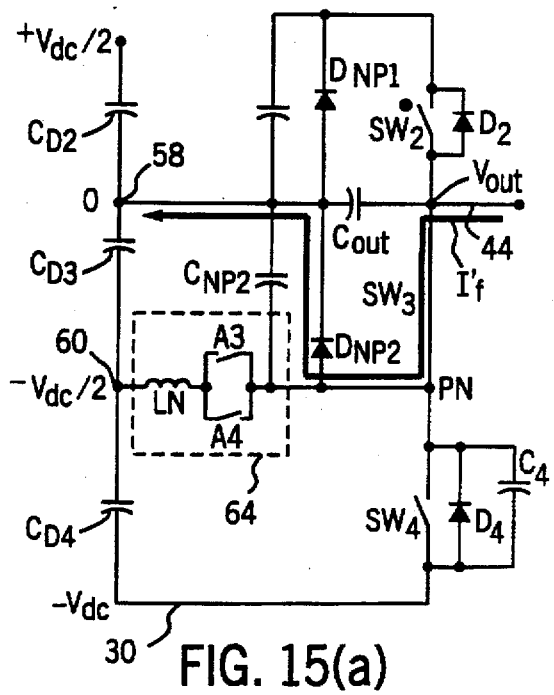
FIGS. 15(a)–15(f) are similar to FIGS. 13(a)–13(c) except that they represent a zero to $-V_{dc}$ switching sequence wherein the line current is negative.

Referring to FIGS. 15(a) and 24(a), prior to $\tau_{30}$, with the second $SW_2$ and third $SW_3$ main switches closed and a negative line current $I_f$, line 44 is connected through the third main switch $SW_3$ and the second clamping diode $D_{NP2}$ to neutral node 58, all line current $I_f$ passing through second clamping diode $D_{NP2}$. Under these conditions the first and second clamping capacitors $C_{NP1}$ and $C_{NP2}$ and the output capacitor $C_{out}$ are all discharged so that the second main switch $SW_2$ can be opened without generating high power loss.

However, prior to closing the fourth main switch $SW_4$, the fourth capacitor $C_4$ has a $-V_{dc}$ potential buildup which must be discharged to facilitate zero voltage switching.

Figure 15B:
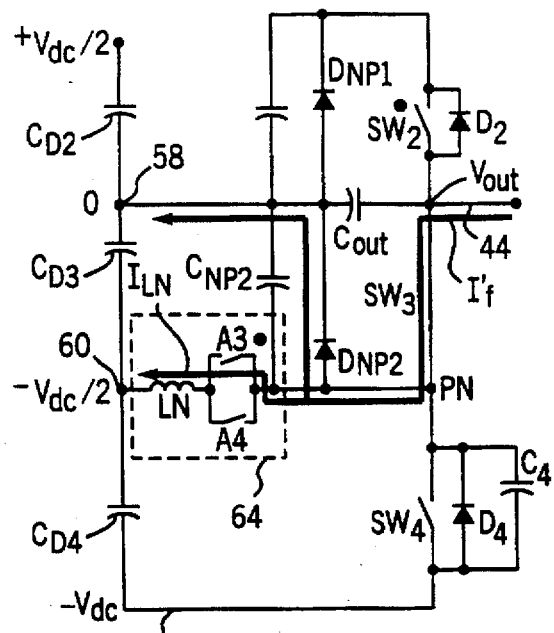
Figure 15C:
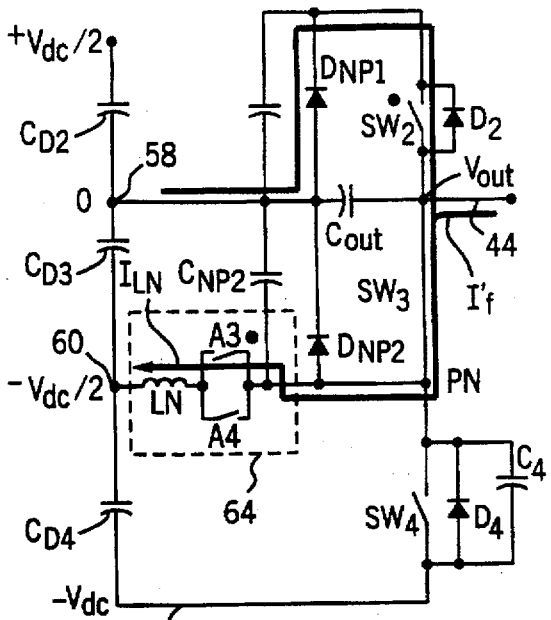

Referring to FIGS. 15(b) and 24(a), to discharge the fourth capacitor $C_4$, the third auxiliary switch $A_3$ is closed at $\tau_{30}$ providing a negative $V_{dc/2}$ potential across the lower inductor LN. The $-V_{dc/2}$ potential generates lower inductor current $I_{LN}$ which increases linearly while the second main switch $SW_2$ remains closed. As lower inductor current $I_{LN}$ approaches line current $I_f$, the inductor current $I_{LN}$ sinks an increasing percentage of the line current $I_f$ thus reducing the current through second clamping diode $D_{NP2}$ until, as seen in FIG. 15(c), the second clamping diode $D_{NP2}$ is turned off at $\tau_{31}$.

Between times $\tau_{31}$ and $\tau_{32}$ the inductor current $I_{LN}$ is allowed to linearly increase further until a sixth boost current level $I_{b6}$ is reached. The sixth boost current level $I_{b6}$ is the current level required to compensate for the negative line current and also to discharge the fourth capacitor $C_4$ during the next delay period. To the extent that the boost current $I_{b6}$ exceeds the line current $I_f$, the excess boost current flows through the second main switch $SW_2$ and the first clamping diode $D_{NP1}$ from neutral node 58.

Figure 15D:
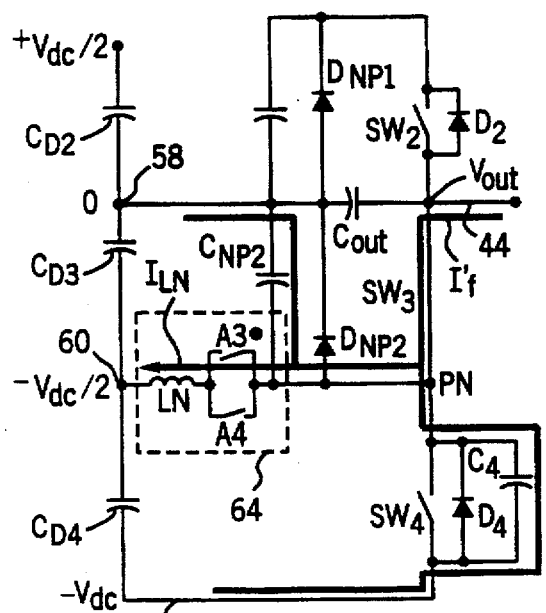

Referring to FIGS. 15(d), 24(a) and 24(b), after boost current level $I_{b6}$ is reached at $\tau_{32}$, the second main switch $SW_2$ is opened cutting off the current path therethrough and placing the fourth $C_4$, second clamping $C_{NP2}$, and output $C_{out}$ capacitors in series with inductor LN. Some of the boost current $I_{b6}$ is drawn through the fourth capacitor $C_4$, discharging it, and charging capacitors $C_{NP2}$ and $C_{out}$ between $\tau_{32}$ and $\tau_{33}$. Preferably, the current is sufficient to discharge the fourth capacitor $C_4$ by time $\tau_{33}$, prior to $\tau_{34}$. Once the fourth capacitor $C_4$ is discharged, the fourth diode $D_4$ is forward biased and clamps the voltage at node PN and output line 44 to $-V_{dc}$ so that the fourth switch potential $V_{SW4}$ is zero prior to $\tau_{34}$ and the fourth switch $SW_4$ is in parallel with a completely discharged capacitor $C_4$.

Figure 15E:
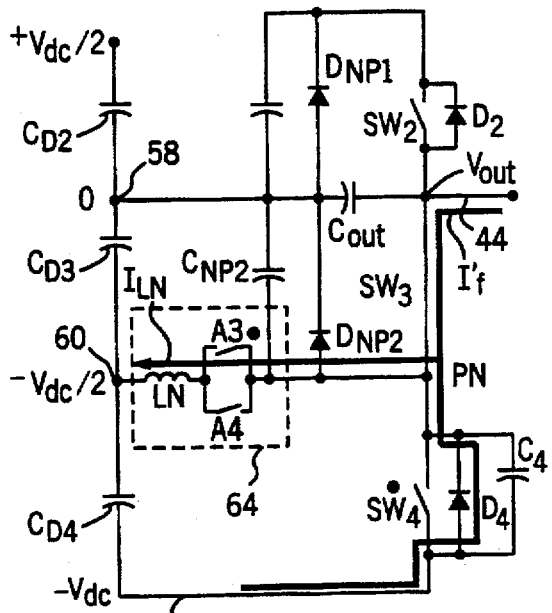
Figure 15F:
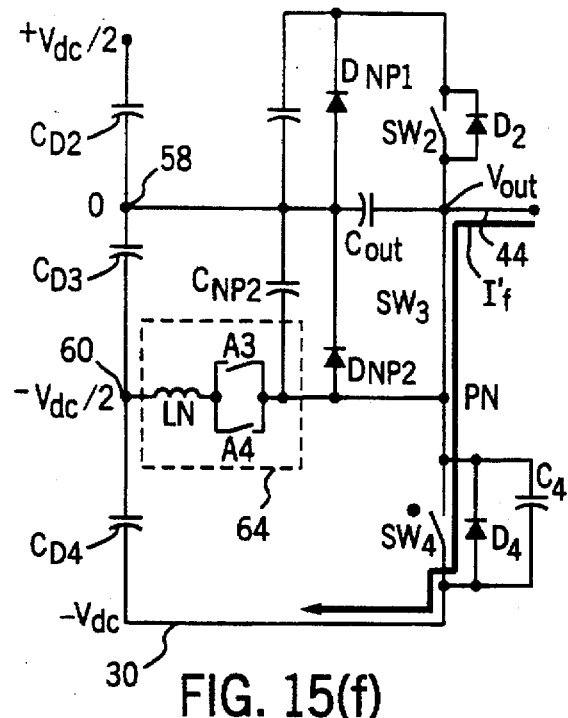

Referring to FIGS. 15(e), 24(a) and 24(b), with no voltage across the fourth main switch $SW_4$, the fourth main switch $SW_4$ can be soft switched (i.e. closed) at or prior to time $\tau_{34}$. With fourth diode $D_4$ biased on, some inductor current $I_{LN}$ which exceeds the line current $I_f$ passes through the fourth diode $D_4$ from the negative DC rail 30. As the lower inductor LN and series capacitors resonate, the lower inductor current $I_{LN}$ eventually decreases and at $\tau_{35}$ the inductor current $I_{LN}$ again equals the line current $I_f$. When the inductor current $I_{LN}$ falls below the line current $I_f$ at $\tau_{35}$, the fourth main switch $SW_4$ conducts as the current in $SW_4$ and $D_4$ combined reverses and begins to sink a portion of the output line current $I_f$. Eventually, referring to FIGS. 15(f) and 24(a), the upper inductor current $I_{LN}$ falls to zero at $\tau_{36}$ turning off the third auxiliary switch $A_3$ so that all line current $I_f$ passes through the fourth main switch $SW_4$ connecting line 44 to the negative DC rail 30.

$-V_{dc}$ To Zero Switching Sequence

Referring now to FIGS. 4 and 6, during a $+V_{dc}$ to zero switching sequence in zone $\zeta_4$, where the line current $\Gamma_f$ is negative and flowing into the inverter leg 32 via line 44, after the fourth main switch $SW_4$ is opened and during a turn-on delay period prior to closing the second main switch $SW_2$, the line current $\Gamma_f$ is forced through the third main switch $SW_3$ and the second clamping capacitor $C_{NP2}$ and through the output capacitor $C_{out}$ and tends to discharge the second clamping $C_{NP2}$ and output $C_{out}$ capacitors as desired. Given an infinite turn-on delay period, any magnitude of negative line current $\Gamma_f$ would be sufficient to completely discharge the second clamping $C_{NP2}$ and output $C_{out}$ capacitors and allow proper transition. Unfortunately, the turn-on delay period is finite and therefore, there is a negative threshold current $\Gamma_{thr}^-$ defined as the minimum current required to completely discharge the second clamping $C_{NP2}$ and output $C_{out}$ capacitors prior to the end of the finite delay period to ensure soft switching of $SW_2$.

When the negative line current $\Gamma_f$ has a greater magnitude than the negative threshold current $\Gamma_{thr}^-$, the line current $\Gamma_f$ alone can completely discharge the second clamping $C_{NP2}$ and output $C_{out}$ capacitors in less than a delay period. However, where the negative line current $\Gamma_f$ has a magnitude less than the negative threshold current $\Gamma_{thr}^-$, the line current $\Gamma_f$ must be supplemented to ensure completely discharged second clamping $C_{NP2}$ and output $C_{out}$ capacitors during a delay period.

Referring still to FIG. 4, during inverter operation in zone $\zeta_4$ the line current $\Gamma_f$ has a greater magnitude than the negative threshold current $\Gamma_{thr}^-$ during period $\zeta''_4$ and has a magnitude less than the negative threshold current $\Gamma_{thr}^-$ during period $\zeta'_4$. Therefore, during period $\zeta'_4$, the line current $\Gamma_f$ need not be supplemented in order to discharge the second clamping $C_{NP2}$ and output $C_{out}$ capacitors. However, during period $\zeta''_4$, the line current $\Gamma_f$ must be supplemented.

Referring again to FIG. 4, during a $-V_{dc}$ to zero switching sequence in zone $\zeta_3$ where the line current $\Gamma_f$ is positive and flowing out of inverter leg 32 via output line 44, after the fourth main switch $SW_4$ is opened and prior to closing the second main switch $SW_4$, the line current $\Gamma_f$ flows from neutral node 58 through the second clamping $C_{NP2}$ and output $C_{out}$ capacitors and the third diode $D_3$ charging both the second clamping $C_{NP2}$ and output $C_{out}$ capacitors. In this case, the line current $\Gamma_f$ must be completely compensated for and a boost current (i.e. current above the line current) must be provided which alone can discharge the second clamping $C_{NP2}$ and output $C_{out}$ capacitors prior to the end of a delay period.

Hence, there are three separate line current-dependent zones of inverter leg operation for the $-V_{dc}$ to zero switching sequence. In a first zone $\zeta'''_4$ the auxiliary circuit 64 is not required. In a second zone $\zeta'_4$, the auxiliary circuit 64 is required to supplement the line current. And in a third zone $\zeta_3$ the auxiliary circuit 64 must both compensate for the line current $\Gamma_f$ and provide an additional discharging boost current over and above the line current.

$\Gamma_f < \Gamma_{thr}^- < 0$

This section explains operation of the inverter leg 32 to switch output potential $V_{out}$ from $-V_{dc}$ to zero where the supply current $\Gamma_f$ is negative and is less than a negative threshold current $\Gamma_{thr}^-$ (i.e. operation within zone $\zeta''_4$). (See FIG. 4.)

Figure 17A:
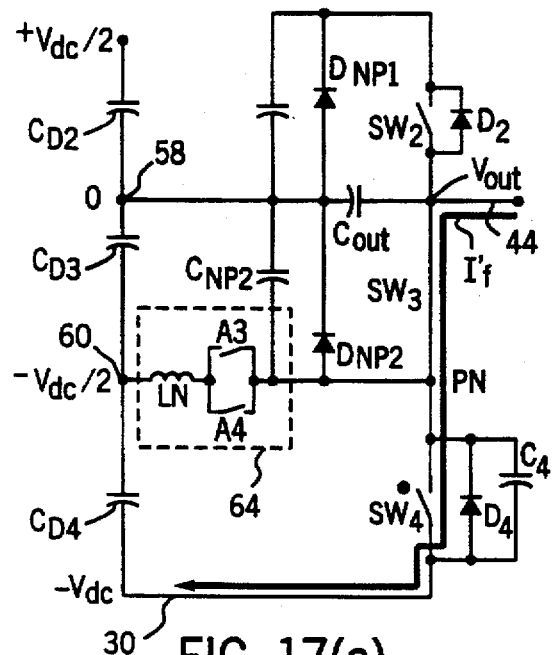
FIGS. 17(a)–17(d) are similar to FIGS. 16(a)–16(e) except that they represent a $-V_{dc}$ to zero switching sequence wherein the line currents are negative and less than the negative threshold current.
Figure 18A:
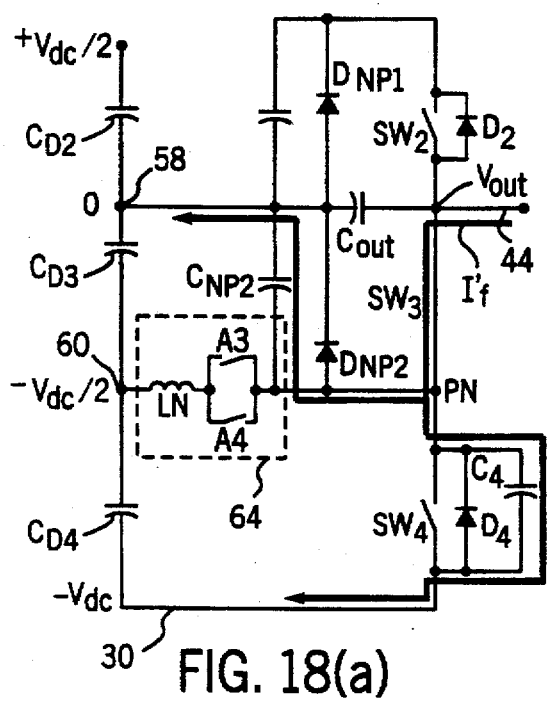
FIGS. 18(a)–18(b) are similar to FIGS. 16(a)–16(e) except that they represent a $-V_{dc}$ to zero switching sequence wherein the line current is negative and greater than the negative threshold current.

Referring to FIG. 17(a), with the third $SW_3$ and fourth $SW_4$ main switches closed and a negative line current $\Gamma_f$ which is less (i.e. greater magnitude) than the negative threshold current $\Gamma_{thr}^-$ coming into the inverter leg 32, the line current $\Gamma_f$ passes through the third main switch $SW_3$ and the fourth main switch $SW_4$ to connect the output line 44 to the negative DC rail 30. At this point the second clamping capacitor $C_{NP2}$ and output capacitor $C_{out}$ are charged with $V_{dc}$ potential. Referring to FIG. 18(a), to discharge the second clamping $C_{NP2}$ and output $C_{out}$ capacitors, the fourth main switch $SW_4$ is opened cutting off that path to the negative line current $\Gamma_f$. When the fourth main switch $SW_4$ is opened, the fourth capacitor acts as a snubber and reduces the dv/dt across the fourth main switch $SW_4$ and consequently minimizes power loss.

When the fourth main switch $SW_4$ is opened, line current $\Gamma_f$ splits between the second clamping capacitor $C_{NP2}$, the output capacitor $C_{out}$, and the fourth capacitor $C_4$. Current forced through the second clamping $C_{NP2}$ and output $C_{out}$ capacitors discharge those capacitors during the delay period prior to closing the second main switch $SW_2$ (during the delay period capacitor $C_4$ is charging up). When the second clamping $C_{NP2}$ and output $C_{out}$ capacitors are fully discharged, the first $D_{NP1}$ and second $D_{NP2}$ clamping diodes clamp node PN to node PP so that zero potential exists across the second main switch $SW_2$.

Figure 18B:
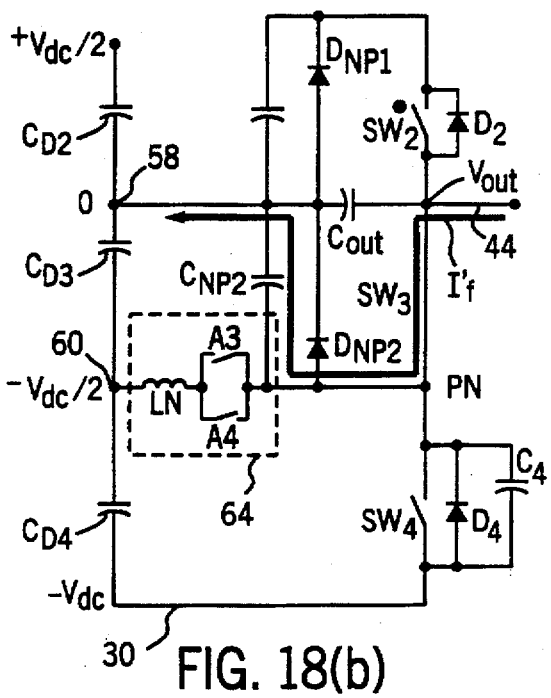

Next, referring to FIG. 18(b), with zero second switch potential $V_{SW2}$, the second main switch $SW_2$ is gated on. In this case, with $\Gamma_f$ negative current will flow in unidirectional switch $SW_3$ and diode $D_{NP2}$ connecting output line 44 to zero as desired.

Hence, where the line current $\Gamma_f$ is less than the negative threshold current $\Gamma_{thr}^-$, the commutation circuit 64 is preferably not operated during the zero to $+V_{dc}$ switching sequence.

$\Gamma_{thr}^- < \Gamma_f < 0$

Referring again to FIG. 4, when the inverter leg 32 is operating in zone $\zeta'_4$, where the line current $\Gamma_f$ is negative but is greater than the negative threshold current $\Gamma_{thr}^-$, the line current $\Gamma_f$ is insufficient alone to discharge the second clamping $C_{NP2}$ and output $C_{out}$ capacitors within the turn-on delay period. As a consequence, the commutation circuit 64 must be employed to allow zero voltage switching of the second main switch $SW_2$.

Figure 26A:
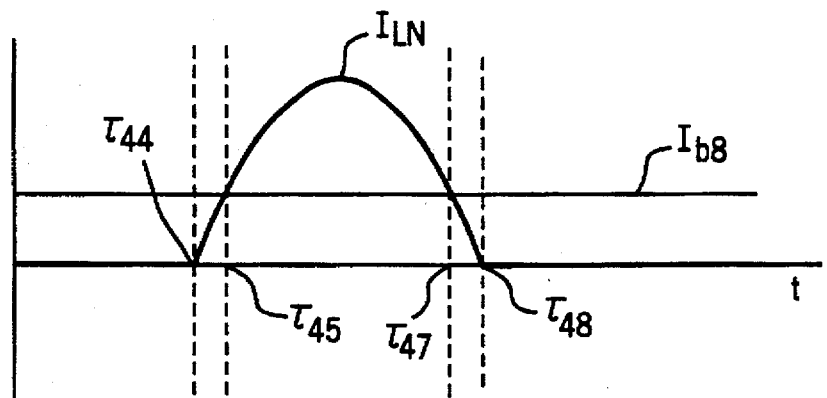
FIGS. 26(a) and 26(b) are similar to FIGS. 19(a) and 19(b) except that they correspond to a $-V_{dc}$ to zero switching sequence wherein the line current is negative.
Figure 26B:
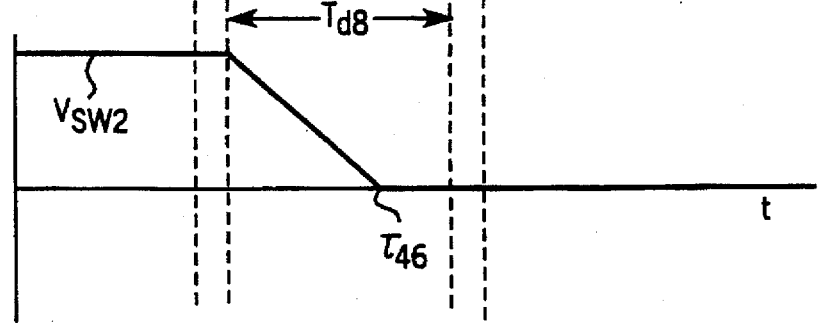

FIGS. 26(a) and 26(b) illustrate waveforms wherein the line current $\Gamma_f$ is less than zero but greater than the negative threshold current $\Gamma_{thr}^+$ during a $-V_{dc}$ to zero switching sequence. FIG. 26(a) illustrates a lower inductor current $I_{LN}$ while FIG. 26(b) illustrates the second main switch voltage $V_{SW2}$ and current $I_{SW2}$. A turn-on delay period between the time when the fourth main switch $SW_4$ is turned off and the second main switch $SW_2$ is turned on is identified as $T_{d8}$.

Figure 17B:
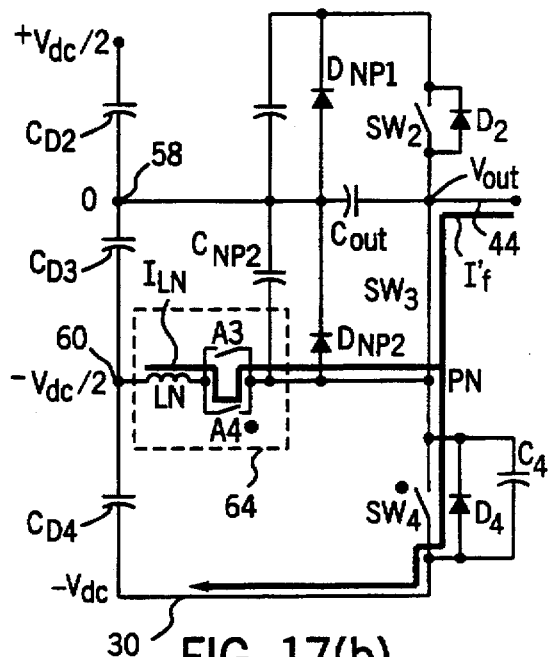

Referring again to FIG. 17(a), initially with both the third $SW_3$ and fourth $SW_4$ main switches closed and a negative line current $\Gamma_f$, the line current $\Gamma_f$ passes through the third main switch $SW_3$ and the fourth main switch $SW_4$ connecting output line 44 to the negative DC rail 30. This initial state is represented in FIG. 26(a) prior to time $Y_{44}$. Referring to FIGS. 17(b) and 26(a), at time $\tau_{44}$, the fourth auxiliary switch $A_4$ is closed thus providing a $+V_{dc}$ potential across the lower inductor LN. The potential across inductor LN provides lower inductor current $I_{LN}$ which flows into node PN and through the fourth main switch $SW_4$ along with the negative supply current $\Gamma_f$. The inductor current $I_{LN}$ increases linearly until a eighth boost level $I_{b8}$ is reached. Boost level $I_{b8}$ is the magnitude of current, in addition to the negative line current $I'_f$, which is required to completely discharge the second clamping $C_{NP2}$ and output $C_{out}$ capacitors during the turn-on delay period $T_{b8}$. Because the inductor current $I_{LN}$ increases linearly, the boost level $I_{b8}$ can be obtained by simply allowing the inductor current $I_{LN}$ to increase for a specific time period. In FIG. 26(a), the period required to provide the boost level $I_{b8}$ is between $\tau_{44}$ and $\tau_{45}$.

Figure 17C:
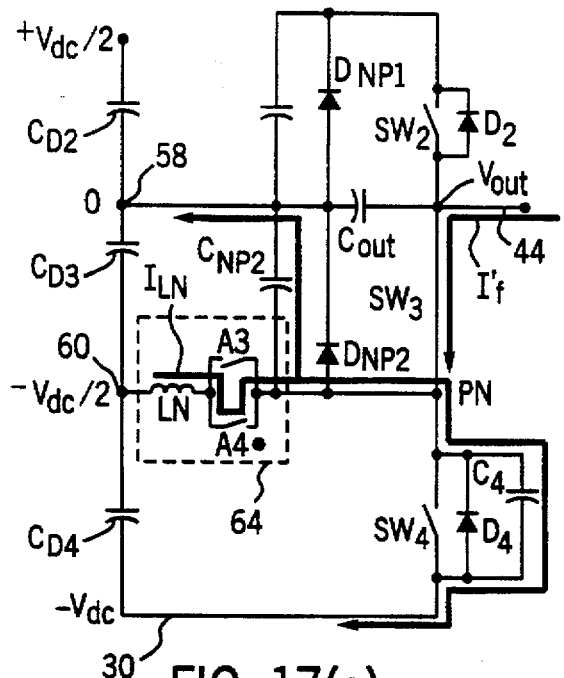

Referring to FIG. 17(c), after the lower inductor current $I_{LN}$ reaches the boost current level $I_{b8}$ at $\tau_{45}$ the fourth main switch $SW_4$ is opened placing the fourth capacitor $C_4$, the second clamping capacitor $C_{NP2}$ and output capacitor $C_{out}$ "in series" with the inductor LN. Referring again to FIG. 4, because the line current $I'_f$ may have any value between zero and the negative threshold current $I^-_{thr}$ during operation in zone $\zeta'_4$, the boost current $I_{b8}$ should have a magnitude great enough to discharge the second clamping capacitor $C_{NP2}$ and output capacitor $C_{out}$ even where the line current $I'_f$ is minimal (i.e. $I'_f \approx 0$).

Referring to FIG. 26(b) when the fourth main switch $SW_4$ is opened at time $\tau_{45}$, current flows through and discharges the second clamping $C_{NP2}$ and output $C_{out}$ capacitor. In addition, some current will flow through the fourth capacitor $C_{NP4}$ charging that capacitor.

Figure 17D:
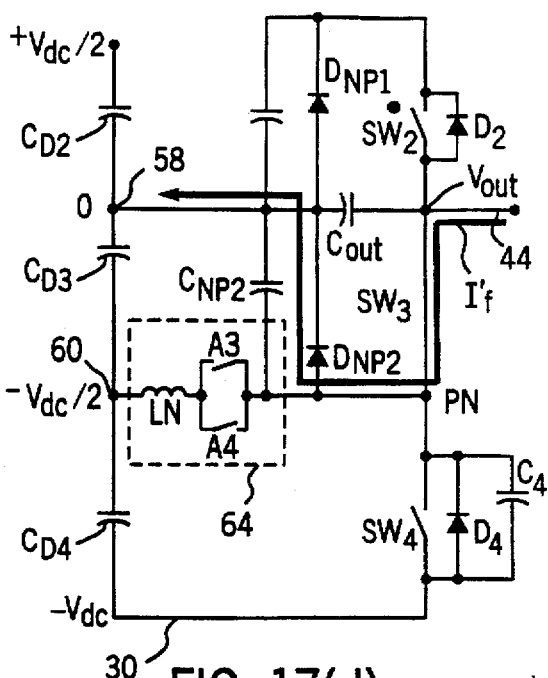

At some time prior to closing the second main switch $SW_2$, the second clamping $C_{NP2}$ and output $C_{out}$ capacitors are completely discharged. Referring also to FIG. 17(d), after the second clamping $C_{NP2}$ and output $C_{out}$ capacitors are completely discharged, the second clamping diode $D_{NP2}$ becomes forward biased and, together with the first clamping diode, clamps zero potential across the second main switch $SW_2$. With zero potential thereacross, the second main switch $SW_2$ is closed at time $\tau_{47}$ and both the line current $I'_f$ and the lower inductor current $I_{LN}$ flow through the second clamping diode $D_{NP2}$ to the neutral node 58. Referring to FIG. 17(d) and 26(a), the inductor current $I_{LN}$ eventually resonates through a sinusoidal waveform until time $\tau_{47}$. At that time the inductor current $I_{LN}$ decreases linearly between times $\tau_{47}$ and $\tau_{48}$. When the inductor current $I_{LN}$ falls to zero at $\tau_{48}$ the fourth auxiliary switch $A_4$ turns off so that only the line current $I'_f$ flows through the second clamping diode $D_{NP2}$ connecting output line 44 to zero or neutral node 58.

$\underline{I'_f \geq 0}$

Here, operation of the inverter leg 32 to switch output potential $V_{out}$ from $-V_{dc}$ to zero where the line current $I'_f$ is positive (i.e. zone $\zeta_3$ operation) is explained in detail.

Figure 25A:
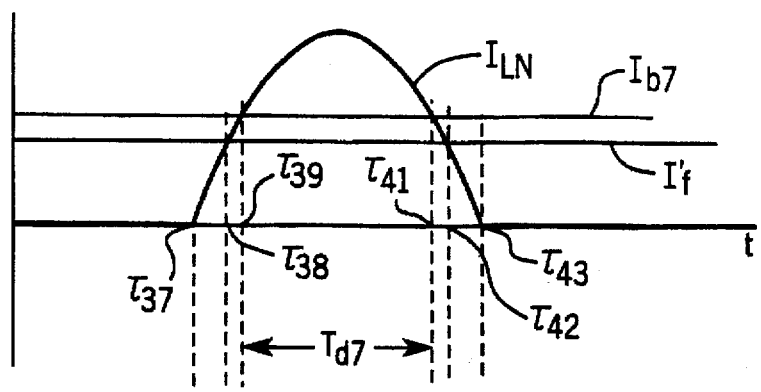
FIGS. 25(a) and 25(b) are similar to FIGS. 19(a) and 19(b) except that they correspond to a $-V_{dc}$ to zero switching sequence wherein the line current is positive.
Figure 25B:
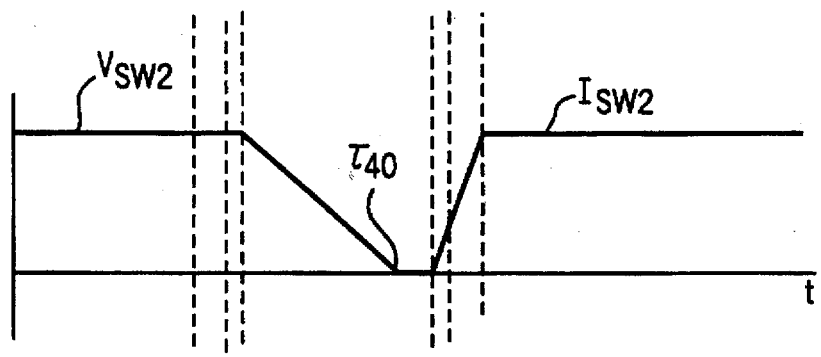

FIGS. 25(a) and 25(b) illustrate waveforms related to inverter leg 32 operation under the aforementioned conditions. FIG. 25(a) illustrates lower inductor current $I_{LN}$ while FIG. 25(b) illustrates second main switch voltage $V_{SW2}$ and current $I_{SW2}$. The delay period is identified as $T_{d7}$.

Figure 16A:
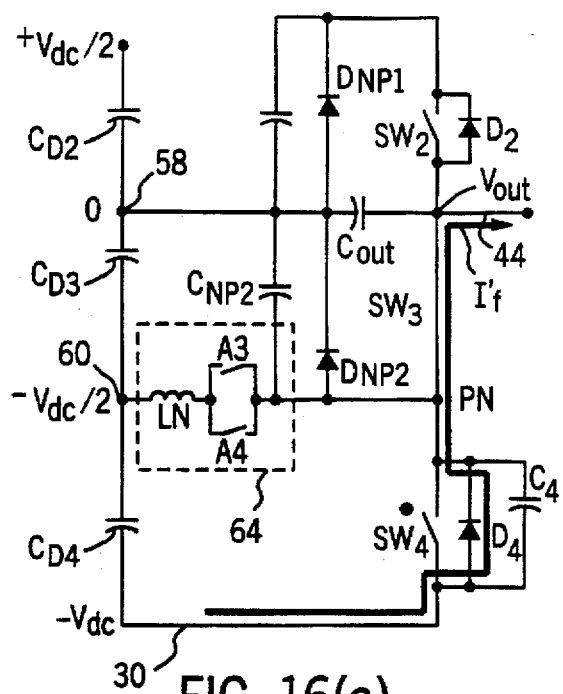
FIGS. 16(a)–16(e) illustrate the sequence and direction of current flow during a $-V_{dc}$ to zero switching sequence wherein the line current is positive.

Referring to FIGS. 16(a) and 25(a), prior to time $\tau_{37}$ with the third $SW_3$ and fourth $SW_4$ main switches closed and a positive line current $I'_f$, line 44 is connected through the third $D_3$ and fourth $D_4$ diodes to the negative DC rail 30. Under these conditions the fourth capacitor $C_4$ id discharged so that the fourth main switch $SW_4$ can be opened without generating high power loss.

However, prior to closing the second main switch $SW_2$, the second clamping $C_{NP2}$ and output $C_{out}$ capacitors have a $+V_{dc}$ potential buildup which must be discharged to facilitate zero voltage switching.

Figure 16B:
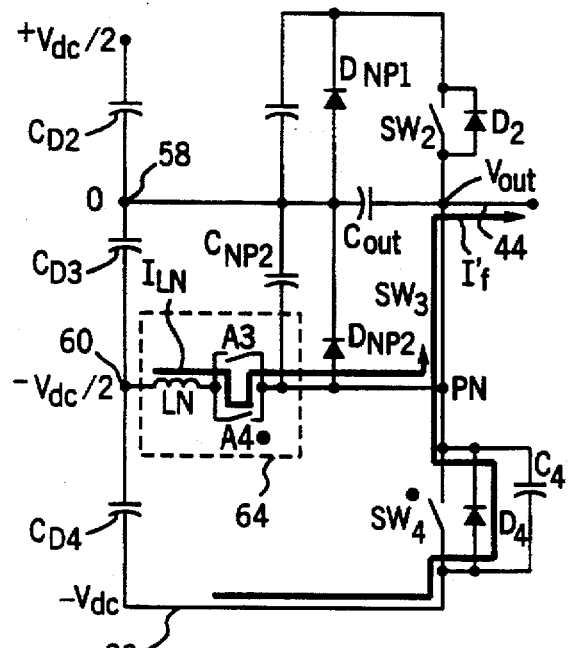

Referring to FIGS. 16(b) and 25(a), to discharge the second clamping $C_{NP2}$ and output $C_{out}$ capacitors the fourth auxiliary switch $A_4$ is closed at $\tau_{37}$ providing a positive $V_{dc/2}$ potential across the lower inductor LN. The $+V_{dc}$ potential generates lower inductor current $I_{LN}$ which increases linearly while the fourth main switch $SW_4$ remains closed. As upper inductor current $I_{LN}$ approaches line current $I'_f$, the inductor current $I_{LN}$ provides an increasing percentage of the line current $I'_f$ thus reducing the current through fourth diode $D_4$ until, as seen in FIG. 16(c), the fourth diode $D_4$ is turned off at $\tau_{38}$.

Between times $\tau_{38}$ and $\tau_{39}$ the inductor current $I_{LN}$ is allowed to linearly increase further until a seventh boost current level $I_{b7}$ is reached. The seventh boost current level $I_{b7}$ is the current level required to compensate for the positive line current and also to discharge the second clamping $C_{NP2}$ and output $C_{out}$ capacitors during the next delay period.

Figure 16C:
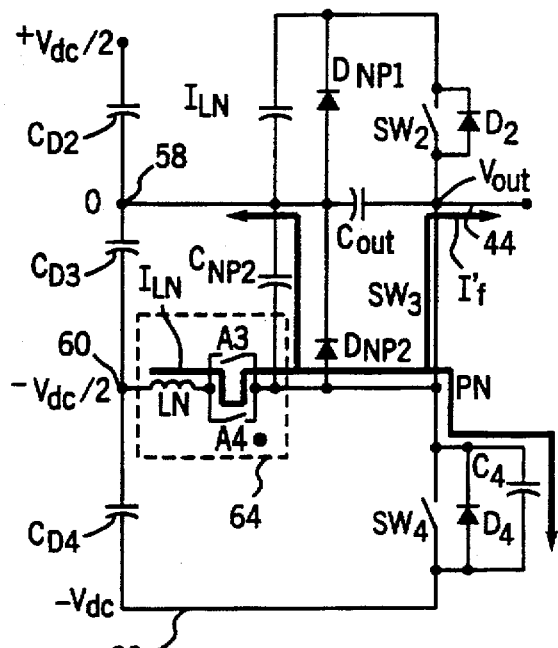

Referring to FIGS. 16(c), 25(a) and 25(b), after boost current level $I_{b7}$ is reached at $\tau_{39}$, the fourth main switch $SW_4$ is opened cutting off the current path therethrough and placing the fourth $C_4$, second clamping $C_{NP2}$, and output $C_{out}$ capacitors in series with inductor LN. Some of the boost current $I_{b7}$ is forced through the second clamping $C_{NP2}$ and output $C_{out}$ and fourth $C_4$ capacitors discharging them and charging capacitor $C_4$ between $\tau_{39}$ and $\tau_{40}$. Preferably, the current is sufficient to discharge the second clamping $C_{NP2}$ and output $C_{out}$ capacitors by time $\tau_{40}$, prior to $\tau_{41}$. Once the second clamping $C_{NP2}$ and output $C_{out}$ capacitors are discharged, the second clamping diode $D_{NP2}$ is forward biased and, together with the first clamping diode $D_{NP1}$ clamps the voltage at node PN to node PP so that the second switch potential $V_{SW2}$ is zero prior to $\tau_{41}$ and the second switch $SW_2$ is in parallel with completely discharged capacitors.

Figure 16D:
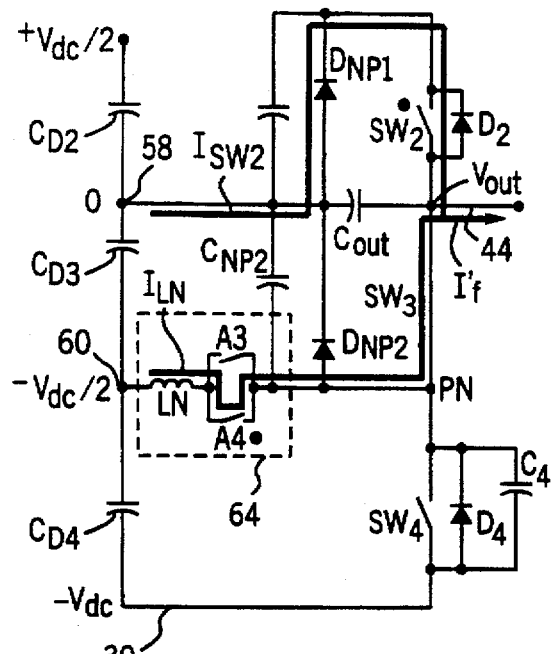
Figure 16E:
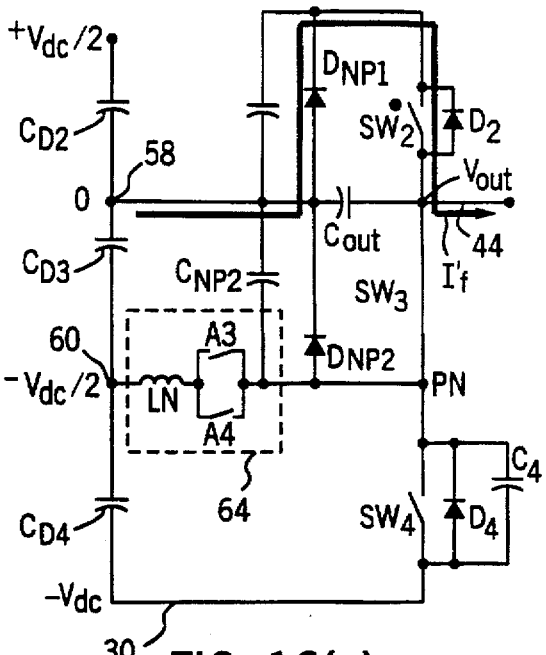

Referring to FIGS. 16(d), 25(a) and 25(b), with no voltage across the second main switch $SW_2$, the second main switch $SW_2$ can be soft switched (i.e. closed) at or prior to time $\tau_{41}$. With third diode $D_3$ biased on, some inductor current $I_{LP}$ which exceeds the line current $I'_f$ passes through the third diode $D_3$. As the lower inductor LN and series capacitors resonate, the lower inductor current $I_{LN}$ eventually decreases and at $\tau_{42}$ the inductor current $I_{LN}$ again equals the line current $I'_f$. When the inductor current $I_{LN}$ falls below the line current $I'_f$ at $\tau_{42}$, the second main switch $SW_2$ conducts as the current in $SW_2$ begins to provide a portion of the output line current $I'_f$. Eventually, referring to FIGS. 16(e) and 25(a), the lower inductor current $I_{LN}$ falls to zero at $\tau_{43}$ turning off the fourth auxiliary switch $A_4$ so that all line current $I'_f$ flows through the second main switch $SW_2$ connecting line 44 to neutral node 58.

Referring again to FIG. 5, implementation of the method required to control the three-phase three-level inverter system of the present invention is simple. Referring again to the three-level inverter leg 32, the line current $I'_f$ is detected by current detector 66 and provided to the PWM controller 22 via line 69. The PWM controller 22 determines the line voltage $V'_f$ and therefore knows both the line voltage $V'_f$ and the instantaneous pulse voltage (i.e., $+V_{dc}$, $-V_{dc}$, or zero). Using the line current $I'_f$, the line voltage $V'_f$ and the instantaneous voltage values, the PWM controller 22 can determine how to fire all of the main switches $SW_1$, $SW_2$, $SW_3$, and $SW_4$, as well as all of the auxiliary switches $A_1$, $A_2$, $A_3$ and $A_4$, according to the switching sequences discussed above.

Thus, it should be understood that a simple, reliable, and cost effective method and three-level inverter apparatus has been described wherein little power loss results from altering the state of inverter switches. In addition, because the present inverter incorporates a three-level topology, output harmonics in both the line voltage $V'_f$ and the line current $I'_f$ are reduced.

It should be understood that the methods and apparatuses described above are only examples and do not limit the scope of the invention, and that various modifications could be made by those skilled in the art that fall under the scope of the invention. For example, while the preferred embodiment has been described as having an output capacitor $C_{out}$ between the output node $V_{out}$ and the neutral node 58, this capacitor is not required for proper operation of the circuit. In addition, if desired, resistor/capacitor snubbers may be placed across the second $SW_2$ and third $SW_3$ main switches for dampening high frequency oscillations. Resistor/capacitor snubbers may be placed across each pair of auxiliary switches (i.e., $A_1$ and $A_2$ or $A_3$ and $A_4$) to dampen overvoltage and reduce stress across those devices at turn-off. A resistor may be placed across each of the first $D_{NP1}$ and second $D_{NP2}$ clamping diodes for bringing the initial voltage across the second $SW_2$ and third $SW_3$ main switches to zero. A saturable inductor (or a saturable inductor with a resistor at the secondary with a proper time constant) could be used for limiting the turn-on and turn-off di/dt in the devices. In addition, during a $+V_{dc}$ to zero switching sequence, the output dv/dt creates a current in the parasitic capacitor of the third main switch $SW_3$ causing the second clamping capacitor $C_{NP2}$ and the fourth capacitor $C_4$ to discharge slightly which affects the turn-on of the third main switch $SW_3$. This can be corrected by providing a resistor between the positive DC bus 28 and node PN which forces the device to turn on under full zero voltage conditions. Similarly, during a $-V_{dc}$ to zero switching sequence, the output dv/dt creates a current in the parasitic capacitor of the second main switch $SW_2$ causing the first clamping capacitor $C_{NP1}$ and the first capacitor $C_1$ to discharge slightly which affects the turn on of the second main switch $SW_2$. By providing a resistor between the negative DC bus 30 and node PP during commutation, the second main switch $SW_2$ can be forced to turn-off under full zero voltage conditions.

Moreover, the present invention contemplates partial switching methods wherein the auxiliary circuits 62, 64 are used during only the most problematic switching periods (i.e. when line current $I_f$ tends to charge snubbing capacitors during delay periods). Thus, where line current discharges snubbing capacitors as desired but does not fully discharge said capacitors, because power loss is minimal, it may be advantageous not to use auxiliary switches under these circumstances. Furthermore, while many different current boost levels ($I_{bn}$ where n is between 1 and 8) have been described, there may be only two boost magnitudes required; one magnitude when both line current must be overcome and an additional boost is required and a second magnitude when the boost current and line current operate together. In the alternative, the controller may be programmed with many different and precise boost levels or, as indicated above, may be programmed to employ an auxiliary circuit during every output voltage change despite whether or not a circuit is required. For example, referring again to FIG. 17($a$), when switching from $-V_{dc}$ to zero with a large negative line current $I_f$, even though the large negative line current may be sufficient to discharge the second clamping $C_{NP2}$ and output $C_{out}$ capacitors during a turn-on delay period, auxiliary switch $A_4$ may still be turned on thus providing additional discharging current.

In addition, the present invention should not be limited to a three-level inverter topology, rather, the present invention contemplates an n-level inverter where n is greater than two. For example, a five-level inverter could provide five different voltage levels at an output line including, in addition to +Vdc, −Vdc and zero, two other voltage levels at +Vdc/2 and −Vdc/2. In this case, the topology would be similar to the three-level topology discussed above except that there would be four auxiliary sources, four other main switches, and other circuitry as described above for each of the other switches. To apprise the public of the scope of this invention, we make the following claims.

We claim:

1. A three-level neutral point clamped inverter leg for providing soft switching of power devices, the inverter leg comprising:

series coupled first, second, third, and fourth main switches connected between positive and negative rails of a DC supply, the first main switch connected between the positive rail and a first node, the second main switch connected between the first node and an output node, the third main switch connected between the output node and a second node, and the fourth main switch connected between the second node and the negative DC rail, the output node also connectable to a load for providing a load current, the DC supply including two DC sources arranged in series, a first DC source connected between the positive DC rail and a neutral node and the second DC source connected between the neutral node and the negative DC rail;

a current provider for providing a boost current source or boost current sink at either the first or second nodes;

first, second, third, and fourth diodes coupled in antiparallel relationship with the first, second, third, and fourth main switches respectively;

first and fourth capacitors coupled in parallel with the first and fourth main switches respectively; and a first clamping diode and a first clamping capacitor connected between the first and neutral nodes and a second clamping diode and a second clamping capacitor connected between the neutral and second nodes, the first clamping diode arranged to pass current from the neutral node to the first node when forward biased and the second clamping diode arranged to pass current from the second node to the neutral node when forward biased.

2. The apparatus of claim 1 further including an output capacitor coupled between the output node and the neutral node.

3. The apparatus of claim 1 wherein the first and second DC sources are substantially identical.

4. The apparatus of claim 3 wherein the first DC source includes identical upper and lower first sources and the second DC source includes identical upper and lower second sources, all of the DC sources connected in series, the upper and lower first sources connected at a third node and the upper and lower second sources connected at a fourth node, the current provider includes first and second current sources, the first current source includes first and second antiparallel coupled auxiliary switches coupled in series with an upper inductor between the first and third nodes and the second current source includes third and fourth antiparallel coupled auxiliary switches coupled in series with a lower inductor between the second and fourth nodes.

5. The apparatus of claim 4 wherein the auxiliary switches are thyristors.

6. The apparatus of claim 1 further including a current sensor for sensing the load current and a threshold determiner for determining if the load current is sufficient to discharge capacitors in parallel with switches prior to turning the switches on.

7. The apparatus of claim 6 wherein, if the load current is insufficient to discharge capacitors in parallel with a switch prior to turning the switch on, the current provider provides a linearly increasing source or sink boost current at either the first or second nodes which has a magnitude that, in conjunction with the load current, is capable of discharging the capacitors that are in parallel with the switch prior to turning the switch on.

8. The apparatus of claim 1 further including a first resistor/capacitor snubber network across the second main switch and a second resistor/capacitor snubber network across the third main switch.

9. The apparatus of claim 1 further including a first resistor connected between the first node and the neutral node and a second resistor connected between the neutral node and the second node.

10. A method for controlling a three-level neutral point clamped inverter leg to provide soft switching of power devices, each inverter leg including a plurality of main switches and an output node which is connected to a load providing a line current thereat and a current means for providing a current source or sink, the leg also including at least one capacitor in parallel with each of the main switches, the inverter controlled so that turn-on delay periods are provided between each time one main switch is turned off and another main switch is turned on, the method comprising the steps of:

during each turn-on delay period, prior to turning on a main switch wherein the main switch to be turned on is a next-on switch:

(a) providing a discharge current including a boost current which, together with said line current, fully discharges all capacitors which are in parallel with said next-on switch so there is substantially zero potential across the next-on switch;

at the end of each turn-on delay period:

(b) turning on said next-on switch; and (c) eliminating said source or sink current.

11. The method of claim 10 wherein the leg includes series coupled first, second, third, and fourth main switches connected between positive and negative rails of a DC supply, the first main switch connected between the positive rail and a first node, the second main switch connected between the first node and the output node, the third main switch connected between the output node and a second node, and the fourth main switch connected between the second node and the negative DC rail, the DC supply including two DC sources arranged in series, a first DC source connected between the positive DC rail and a neutral node and the second DC source connected between the neutral node and the negative DC rail, each main switch having an antiparallel diode connected thereacross and the first and fourth main switches each having a capacitor coupled in parallel therewith, each leg including a first clamping diode and a first clamping capacitor connected between the first and neutral nodes and a second clamping diode and a second clamping capacitor connected between the neutral and second nodes, the first clamping diode arranged to pass current from the neutral node to the first node when forward biased and the second clamping diode arranged to pass current from the second node to the neutral node when forward biased, wherein the turn-on delay period begins when one of said main switches is turned off, the switch which is turned off being an off-switch, and the step of providing a discharge current includes the steps of, prior to turning off the off-switch, providing an increasing current that, when added to the line current, would discharge all capacitors in parallel with the next-on switch during the turn-on delay period, and allowing the current magnitude to increase until the magnitude is equal to the discharge current.

12. The method of claim 11 wherein the current means includes a first current source connected at the first node and a second current source connected at the second node and the step of providing a discharge current includes, when switching between the neutral node and the positive DC rail, providing the discharge current at the first node and, when switching between the neutral node and negative DC rail, providing the discharge current at the second node.

13. The method of claim 12 wherein the first current source includes first and second antiparallel coupled auxiliary switches coupled in series with an upper inductor at the first node and the second current source includes third and fourth antiparallel coupled auxiliary switches coupled in series with a lower inductor, and the step of providing the discharge current at the first node includes turning on either the first or the second auxiliary switches to place a potential across said upper inductor and the step of providing the discharge current at the second node includes turning on either the third or the fourth auxiliary switches placing a potential across said lower inductor.

14. The method of claim 13 wherein the step of providing the discharge current includes, when switching from the neutral node to the positive DC rail, turning on the second auxiliary switch to provide a current source at the first node, when switching from the positive DC rail to the neutral node, turning on the first auxiliary switch to provide a current sink at the first node, when switching from the neutral node to the negative DC rail, turning on the third auxiliary switch to provide a current sink at the second node, and when switching from the negative DC rail to the neutral node, turning on the fourth auxiliary switch to provide a current source to the second node.

15. The method of claim 14 wherein the converter includes a current sensor for each phase, each current sensor determining the sign of a corresponding load current, the step of providing the discharge current including the steps of:

determining the sign of the load current;

(a) when switching from the neutral node to the positive DC rail and the line current is positive, turning on the second auxiliary switch to apply a forcing potential across the upper inductor substantially equal to one-half the potential of one of the DC sources to provide a current at the first node, allowing the current in the upper inductor to increase to a first boost current level where the first boost current level is the sum of the line current and an auxiliary current wherein the auxiliary current is the current required to discharge the first capacitor during a turn on delay period;

(b) when switching from the positive DC rail to the neutral node and the line current is negative, turning on the first auxiliary switch to apply a forcing potential across the upper inductor substantially equal to one-half the potential of one of the DC sources to provide a current sink at the first node, allowing the current in the upper inductor to increase to a second boost current level where the second boost current level is the sum of the line current and an auxiliary current wherein the second boost current is the current required to discharge all capacitors in parallel with the third main switch;

(c) when switching from the neutral node to the negative DC rail and the line current is negative, turning on the third auxiliary switch to apply a forcing potential across the lower inductor substantially equal to one-half the potential of one of the DC sources to provide a current sink at the second node, allowing the current in the lower inductor to increase to a third boost current level where the third boost current level is the sum of the line current and an auxiliary current wherein the auxiliary current is the current required to discharge the fourth capacitor during a turn-on delay period; and (d) when switching from the negative DC rail to the neutral node and the line current is positive, turning on the fourth auxiliary switch to apply a forcing potential across the lower inductor substantially equal to one-half the potential of one of the DC sources to provide a current at the second node, allowing the current in the lower inductor to increase to a fourth boost current level where the fourth boost current level is the sum of the line current and an auxiliary current wherein the auxiliary current is the current required to discharge all of the capacitors that are in parallel with the second main switch during a turn-on delay period.

16. The method of claim 15 wherein each current sensor can also determine the magnitude of a corresponding load current and the converter provides positive and negative threshold current levels, the negative threshold current being the magnitude of current required to discharge the first capacitor during a turn-on delay period and the positive threshold current being the magnitude of current required to discharge the fourth capacitor during a turn-on delay period, and the step of providing the discharge current further including the steps of:

determining the magnitude of the load current;

(a) when switching from the neutral node to the positive DC rail with a negative line current which is less than the negative threshold current, turning on the second auxiliary switch to apply a forcing potential across the upper inductor substantially equal to one-half the potential of one of the DC sources to provide a current at the first node, allowing the current in the upper inductor to increase until the sum of the upper conductor current and the line current is sufficient to discharge the first capacitor during a delay period;

(b) when switching from the positive DC rail to the neutral node with a positive line current which is less than the positive threshold current, turning on the first auxiliary switch to apply a forcing potential across the upper inductor substantially equal to one-half the potential of one of the DC sources to provide a current sink at the first node, allowing the current in the upper inductor to increase until the sum of the upper inductor current and the line current is sufficient to discharge all of the capacitors that are in parallel with the third main switch during a delay period;

(c) when switching from the neutral node to the negative DC rail and the line current is positive and less than the positive threshold current, turning on the third auxiliary switch to apply a forcing potential across the lower inductor substantially equal to one-half the potential of one of the DC sources to provide a current sink at the second node, allowing the current in the lower inductor to increase until the sum of the lower inductor current and the line current is sufficient to discharge the fourth capacitor during a delay period; and (d) when switching from the negative DC rail to the neutral node and the line current is negative and greater than the negative threshold current, turning on the fourth auxiliary switch to apply a forcing potential across the lower inductor substantially equal to one-half the potential of one of the DC sources to provide a current at the second node, allowing the current in the lower inductor to increase until the sum of the lower inductor current and the line current is sufficient to discharge all of the capacitors in parallel with the second main switch during a delay period.

17. The method of claim 16 wherein the step of providing the discharge current further including the steps of, under all other circumstances, providing zero discharge current.

18. The method of claim 13 wherein the auxiliary switches are thyristors and the step of eliminating said auxiliary current includes the step of allowing the currents through said series coupled inductors to resonate to zero.

19. The method of claim 11 wherein the step of providing the increasing current until the current magnitude equals the discharge current includes the step of providing a linearly increasing current for a period calculated to generate the desired discharge current.

20. An n-level neutral point clamped inverter leg for providing soft switching of power devices where n is greater than two, the inverter leg comprising:

a DC supply providing n different potential rails including a zero potential rail, and at least one maximum positive potential rail and one maximum negative potential rail;

a plurality of series coupled switches connected between the maximum positive and negative potential rails, the switches arranged in (n−1) pairs, switches in each pair connected at intraswitch nodes and adjacent switch pairs connected at interswitch nodes, a first switch connected to the maximum positive potential rail and a (2n−2) switch connected to the maximum negative potential rail, each of the interswitch nodes uniquely connected to a different one of said potential rails, one of the interswitch nodes connected to an output line which is connectable to a load;

a plurality of capacitors, at least one of said capacitors arranged in parallel with each of said switches;

a plurality of diodes, a different one of said diodes coupled in antiparallel relationship with each of said switches;

a current provider for providing a discharging current source or sink at any of the intraswitch nodes; and a controller for controlling the current provider and the switches;

whereby, the controller controls the switches and the current provider so that, prior to changing the state of a switch, the current provider provides a current source or a current sink to at least one of said intraswitch nodes to discharge all capacitors in parallel with said switch so that at least one diode in parallel with said switch clamps zero voltage across said switch.

21. The inverter leg of claim 20 wherein the switch pairs include (n−1)/2 pairs connected in series between the maximum positive potential rail and the output line and (n−1)/2 pairs connected in series between the maximum negative potential rail and the output line.

22. The inverter leg of claim 21 wherein the maximum negative and maximum positive potential rails have substantially identical magnitudes.

23. The inverter leg of claim 22 wherein the potential rails include identical numbers of positive and negative potential rails and, for each positive potential rail there is a negative potential rail that has a substantially identical magnitude.

24. The inverter leg of claim 23 wherein the current provider includes (n−1) auxiliary circuits, one circuit connected to each of the intraswitch nodes, each auxiliary circuit capable of providing either a current sink or a current source.

25. The inverter leg of claim 24 wherein each auxiliary circuit includes first and second antiparallel coupled auxiliary switches coupled in series with an inductor, the auxiliary circuit connected between an intraswitch node and one of said DC potential rails.

* * * * *